United States Patent [19]

Araki et al.

[11] Patent Number: 4,737,847

[45] Date of Patent: Apr. 12, 1988

[54] ABNORMALITY SUPERVISING SYSTEM

[75] Inventors: Tsunehiko Araki, Takarazuka; Satoshi Furukawa, Osaka; Tadashi Satake, Hirakata; Hidekazu Himezawa, Shijonawate, all of Japan

[73] Assignee: Matsushita Electric Works, Ltd., Osaka, Japan

[21] Appl. No.: 913,842

[22] Filed: Sep. 30, 1986

[30] Foreign Application Priority Data

| | | | |
|---|---|---|---|
| Oct. 11, 1985 | [JP] | Japan | 60-227398 |
| Dec. 10, 1985 | [JP] | Japan | 60-277499 |
| Dec. 10, 1985 | [JP] | Japan | 60-277501 |
| Mar. 24, 1986 | [JP] | Japan | 61-68106 |
| Mar. 24, 1986 | [JP] | Japan | 61-68107 |
| Mar. 24, 1986 | [JP] | Japan | 61-68108 |
| Mar. 24, 1986 | [JP] | Japan | 61-68109 |

[51] Int. Cl.[4] .............. H04N 7/18

[52] U.S. Cl. .............. 358/108; 358/105; 358/1

[58] Field of Search .............. 358/105, 108, 219, 1

[56] References Cited

U.S. PATENT DOCUMENTS

| | | | |
|---|---|---|---|
| 3,691,302 | 9/1972 | Gaebele | 358/219 |
| 3,890,463 | 7/1975 | Ikegami | 358/1 |
| 3,988,533 | 10/1976 | Mick | 358/105 |
| 4,249,207 | 2/1981 | Harman | 358/105 |

*Primary Examiner*—Howard W. Britton
*Attorney, Agent, or Firm*—Burns, Doane, Swecker & Mathis

[57] ABSTRACT

An abnormality supervising system compares an input picture with a previously stored reference picture having no abnormality, provides a compared picture signal to an abnormality discrimination means having preliminarily stored information for abnormality discrimination, and, upon presence of an abnormality, operates an output means for informing operation, whereby the abnormality discrimination means can effectively attain the abnormality discrimination on the basis of the preliminarily stored information, in a highly reliable manner.

29 Claims, 40 Drawing Sheets

(b)

ABNORMALITY SUPERVISING SYSTEM

TECHNICAL BACKGROUND OF THE INVENTION

This invention relates to abnormality supervising systems employing picture input means including such picture pickup means as TV cameras and the like and, more specifically, to an abnormality supervising system of a picture recognition type in which an input picture obtained by the picture pickup means with respect to a predetermined monitoring zone is processed to detect absence or presence of abnormality occurring in the zone.

The abnormality supervising system of the type referred to contributes effectively to crime prevention of intrusion into private houses and grounds, burglary to art galleries or exhibition halls and so on, and is also effectively employed as a fire protecting system for detecting fire occurrence in residential houses, office buildings, factories and the like, or as a safety system for preventing any accident in such specific areas as factories due to any abnormality occurrence.

DISCLOSURE OF PRIOR ART

There has been suggested, for example, an abnormality supervising system in which a luminance difference between corresponding picture elements of an input picture obtained through, for example, a picture pickup means and of a previously prepared reference picture indicative of a normal state of the monitoring zone is obtained and converted to a binary signal and then the number of the picture elements of the luminance difference exceeding a set level is counted. According to this system, a certain large number having reached by such picture elements in the luminance difference more than the set level is discriminated as an occurrence of a remarkable change in the monitoring zone of the picture pickup means, and thus as an abnormality taken place in the zone, and, when such large number exceeds a predetermined value, the abnormality occurrence is informed by an alarm sound or the like. This system, however, has had a problem that, since the discrimination of abnormality occurrence is made only on the basis of the luminance difference between the input and reference pictures, even a variation in the luminance caused due to a shaking of tree located in the monitoring zone, falling rain or snow, lightning or the like is informed as the abnormality occurrence.

Also disclosed in U.S. Pat. No. 4,249,207 to R. K. Harman et al is a supervisory system, in which a detection zone is set to lie between two parallel fences, the detection zone is divided into an array of cells each enclosing the monitored image of a man in response to his varying distance, and input video image for each cell is digitalized to discriminate variations in the light level of the respective images. With this system, an object moving at a certain speed can be discriminated by means of a filtering in time, while an object considerably larger or smaller than each cell can be discriminated by means of spatial filtering. Therefore, this supervisory system can be arranged to discriminate an abnormally moving object from a normally moving object. However, this arrangement still involves a problem that even a man abnormally moving without any criminal intent of theft or like is grasped. In other words, the system has been defective in that its discriminating measure for any abnormally moving object is insufficient and is thus unable to precisely discriminate abnormality from normality sufficiently satisfactorily.

TECHNICAL FIELD OF THE INVENTION

A primary object of the present invention is, therefore, to provide an abnormality supervising system which can discriminate moving attitude of an object within a zone monitored by a picture input means with a high precision to realize discrimination between normal and abnormal states sufficiently satisfactorily, for remarkably improving the reliability.

According to the present invention, this object is attained by providing an abnormality supervising system wherein input pictures of a monitoring zone obtained by a picture input means are compared with a reference picture, the pictures are processed by a picture processing means to obtain information necessary for discriminating the abnormality, and the abnormality is discriminated on the basis of the thus obtained information, the system being characterized in comprising means for previously storing therein the information necessary for the abnormality discrimination to be compared with the information obtained from the picture processing means, and means for discriminating the abnormality on the basis of the information obtained from the picture processing means and the information in the storing means.

Other objects and advantages of the present invention shall be made clear in the following description of the invention detailed with reference to preferred embodiments shown in accompanying drawings.

Figure 1:
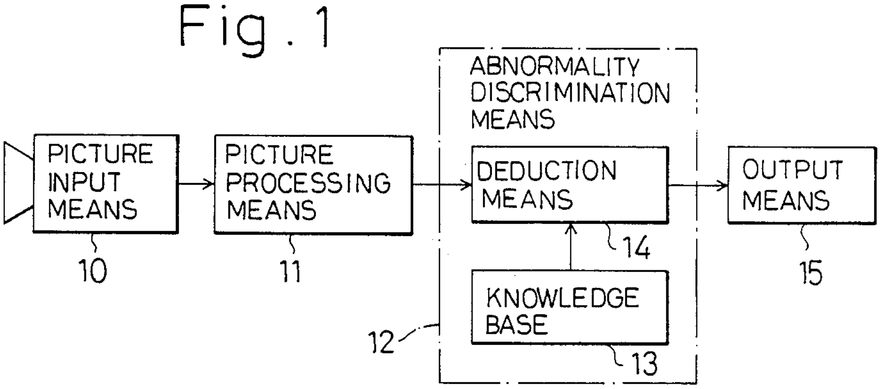
FIG. 1 is a block diagram of a basic embodiment of the abnormality supervising system according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1, there is shown an abnormality supervising system according to the present invention, which comprises a picture input means 10 which may be one of such picture pickup means as visual and infrared range TV cameras including vidicon, CCD and the like, or preferably an infrared TV camera of a pyroelectric vidicon type specifically useful in detecting intruders, fire and the like. As the picture pickup means, further, a color TV camera, wireless TV camera of wireless picture signal transmission type or the like may be used. A monitoring-area picture signal picked up by the picture input means 10 is converted to a digital signal in the input means 10 and then sent to a picture processing means 11.

Figure 2:
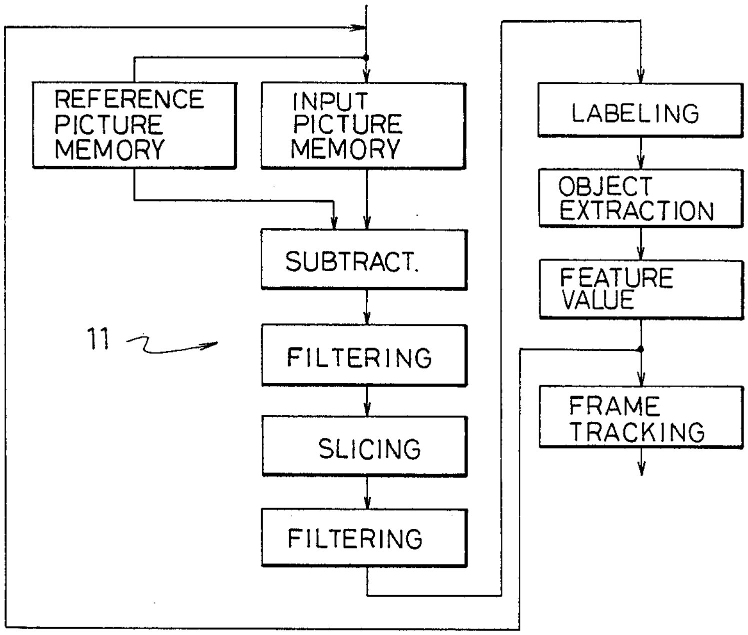
FIG. 2 is a flowchart showing the processing algorithm of a picture processing means in the system of FIG. 1.

In the picture processing means 11, as will be clear from FIG. 2 showing a picture processing algorithm, and inter-picture-element subtraction is first performed between momentarily varying input picture of monitoring zone received from the picture input means 10 as A/D converted therein and such a reference picture containing no abnormality signal in respect of the same monitoring zone that has been obtained by storing previous picture in normal state, whereby a converted picture in which only picture elements showing any change in their luminance are provided with a certain value will be obtained. The picture thus subjected to the subtraction is then subjected to a filtering processing with use of, for example, a 3×3 mask to reduce or eliminate noise. Next, the respective picture elements are sliced with predetermined upper and lower limits to convert the picture elements in a predetermined range in binary signals, which signals are again filtered for noise elimination, and then the picture of the binary signals are labeled. From respective objects in the labeled picture, any object having a predetermined area, i.e., a picture element number less than predetermined is removed while other objects of the picture elements more than the predetermined area are calculated with respect to such feature values as centroid position, two-dimensional moment and the like. This picture processing procedure is executed for each input picture frame, and thus processed object is subjected to a frame tracking and is provided, together with a warning level value later described in the monitoring zone, to an abnormality discrimination means 12 of a unique arrangement in the present invention.

Figure 3:
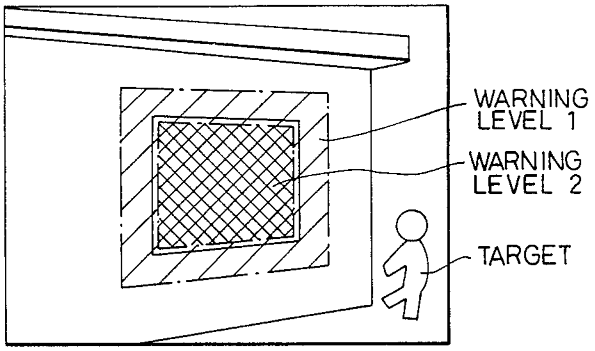
FIG. 3 is a diagram for explanation of the usage of the system of FIG. 1.

The abnormality discrimination means 12 forms a so-called expert system, that is, the means is so provided that a deduction means 14 discriminates the presence or absence of an abnormality on the basis of information from a knowledge base 13, the information having been obtained from a viewpoint of crime preventive supervision and preliminarily provided in the base 13. Referring more in details with reference to FIG. 3, it is here assumed that a house window is being monitored by an externally installed TV camera in a framing as shown, with differently ranked warning levels according to the information of the knowledge base 13 in such that an outer peripheral area shown as hatched of the window is set to have a warning level of 1 and an inner area of the window itself is to have a warning level of 2, while other area than these two is given a warning level of 0, the large number of the warning level demanding a higher warning degree. In this case, the knowledge base 13 stores as its knowledge many rules according to which the discrimination is so made that, with movement with time of any monitored moving object employed as a parameter, the monitored object is determined to be a dweller or a passerby who shows a normal moving pattern or to be an intruder of an abnormal moving pattern, and an information on the window obtained by monitoring it as seen in FIG. 3 and through the picture processing means 11 is subjected to the discrimination of the absence or presence of any abnormality. It should be appreciated that the discrimination rules can be of various sorts, one of which, for example, will be that, when the monitored object is present only within the area having the warning level 2, the object is judged to be a dweller, while an object moving sequentially from the area of warning level 0 through the level 1 area to the level 2 area and staying in the level 2 area is judged to be an intruder.

Further, in an event where the window of FIG. 3 to be monitored involves a tree or shrub which provides a dead angle on the TV camera, the picture pickup means of the picture input means 10 may include two or more TV cameras. When it is desired to keep the supervising system operative only in the nighttime, the system can be operatively associated with a light sensor, timer or the like to realize the supervision only for a desired time zone. In addition, the abnormality supervising system according to the present invention may be operatively associated with a human body sensor to employ a discriminating rule for their associated operation.

When the abnormality discrimination means 12 discriminates that an abnormality is present, the means 12 provides an abnormality discrimination output to an output means 15 which causes, for example, a portion in which the abnormality is present flickered on a monitoring video screen or a voice signal generated, for an alarm operation. The output means 15 also may cause the abnormality portion color-displayed, the object's abnormal movement displayed in locus, or location and time of the abnormality recorded. Further, the output means 15 may even be designed to execute a wireless transmission of an abnormality informing signal or of an image showing the abnormality.

Such setting of the areas of different warning levels 1 and 2 in the monitoring zone as shown in FIG. 3 can be performed before placement of the system into its monitoring state by using a light pen, cursor or the like with respect to the monitoring video screen, and this warning area setting can be achieved by using such a means as a graphic tablet based on a video image, photograph or the like of the monitoring zone.

Figure 5:
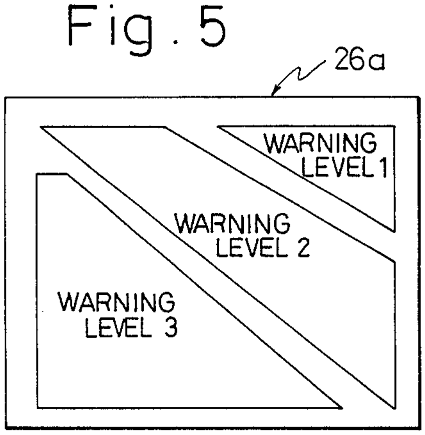
FIG. 5 is a diagram for explanation of the usage of the system of FIG. 4.
Figure 4:
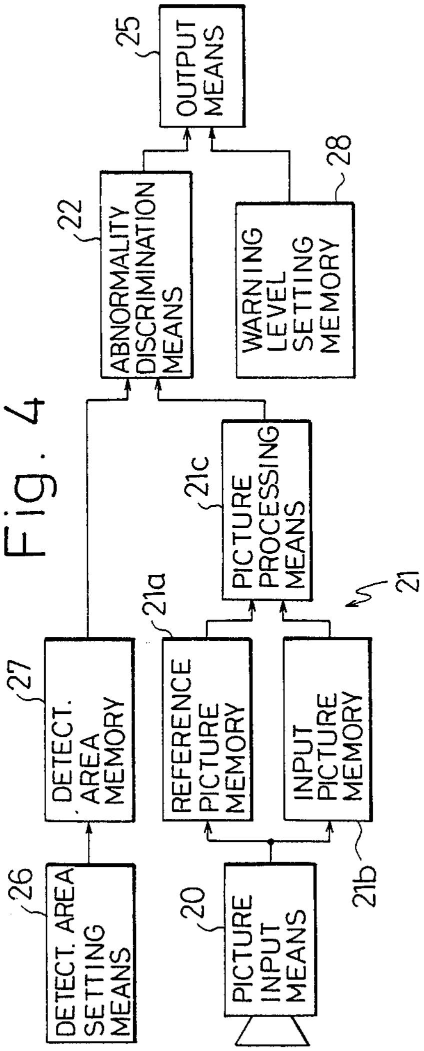
FIG. 4 is a block diagram of a practical embodiment of the abnormality supervising system according to the present invention.

There is shown in FIG. 4 a practical abnormality supervising system embodying the basic system of FIG. 1, wherein the same constituent parts as those of FIG. 1 are denoted by the same reference numerals but added by 10. More particularly, as will be clear from FIG. 4, an abnormality discrimination means 22 realizes the algorithm explained with reference to FIG. 2, that is, receives an output of a picture processing section 21 including a reference picture memory 21*a*, an input picture memory 21*b* and a picture processing means 21*c* as well as an output of a detection area memory 27 receiving an output of a detection area setting means 26 which is provided to divide the monitoring zone into several areas of different warning levels according to the demanded warning degree as shown in FIG. 3. A monitoring zone 26*a* of FIG. 5 may be divided into three areas having sequentially increasing warning levels 1 to 3 by, for example, drawing the areas with a light pen based on a reference picture, or into four or more areas. The warning area information set by the detection area setting means 26 is stored in a detection area memory 27 so that the abnormality discrimination means 22 provides to an output means 25 an output corresponding to the warning degree or level on the basis of a luminance change component of the input picture with respect to the reference picture from the picture processing means 21, that is, the abnormal information and stored contents about the warning levels in the detection area memory 27.

The output means 25 also receives an output of a warning level setting memory 28 which stores information necessary to provide different warnings according to the warning levels, whereby the output means 25 can allow such informing operation as different alarm sound generation responsive to the warning levels, and the like operation.

Figure 6:
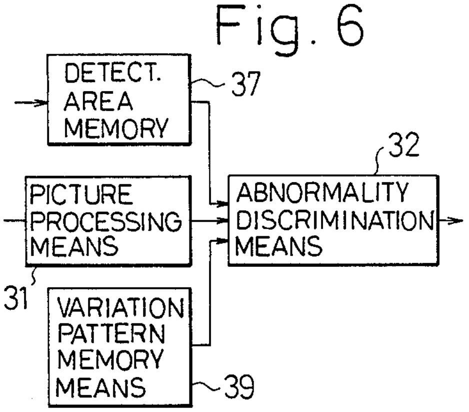
FIG. 6 is a block diagram at a major part of another embodiment of the system according to the present invention.
Figure 7:
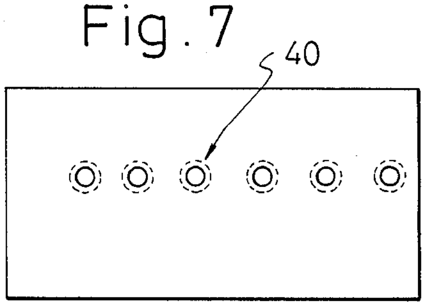
FIGS. 7 and 8 are diagrams for explaining the usage of the system of FIG. 6, respectively.

The abnormality supervising system according to the present invention can be also used in detecting occurrence of any abnormality in factory production line by means of monitoring lamps indicative of operating states of machines or the like installed in factories. Referring to FIG. 6, in which the same major constituent parts of this embodiment as those in the embodiment of FIG. 4 are denoted by the same reference numerals but added by 10 and other constituent parts not illustrated in FIG. 6 may be the same as the corresponding parts in the embodiment of FIG. 4, an output of a variation pattern memory means 39 is provided to an abnormality discrimination means 32, in addition to outputs of a picture processing section 31 including a picture processing means 31*c* and of a detection area memory 37. The present embodiment is arranged so that, when a variation with respect to the reference picture takes place in a predetermined area of the input picture, the pattern memory means 39 changes its memory content to conformit to the variation, and an output means 35 is thereby actuated to perform an informing operation. Assuming, for example, that such detection areas as shown by dotted lines in FIG. 7 are set in correspondence to an array 40 of lamps indicative of operating states of various machines in a factory, and that simultaneous flickering of first and third lamps in the array 40 indicates an abnormal state, this should be so stored in the variation pattern means 39 that an abnormality occurrence in the production line can be accordingly informed.

Figure 8:
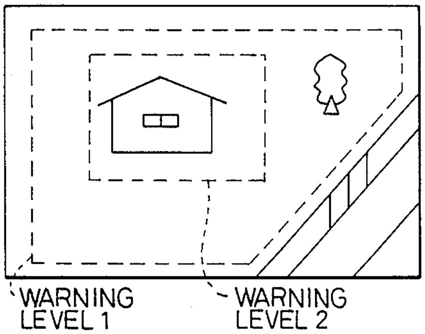

The variation pattern memory means 39 can be effectively used also for supervising an intruder. To this end, such two-level warning supervision set for the house window as in FIG. 3 is assumed to be performed with respect to a residential ground, and the warning level is so set that, as in FIG. 8, substantially the whole ground area including a house is set to have a warning level of 1 while an inner restricted area covering the house and immediately house-surroundings is to have a warning level of 2, and the variation pattern memory means 39 is so provided as to store a pattern which determines that objects moving sequentially from the warning level 1 area to the level 2 area only through a predetermined gate part of the level 1 area are normal whereas objects moving from the level 1 area to the level 2 area not through the gate part are abnormal, for an effective informing operation.

Figure 9:
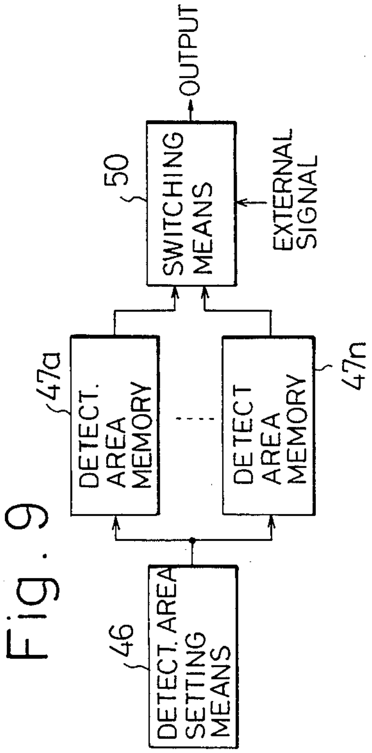
FIG. 9 is a block diagram at a major part of another embodiment of the system according to the present invention.
Figure 10:
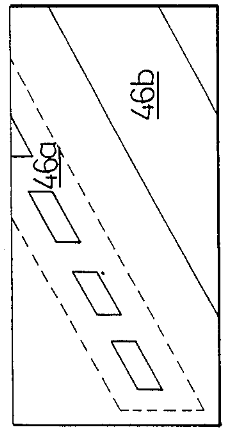
FIG. 10 is a diagram for explaining the usage of the system of FIG. 9.

Referring to FIG. 9, there is shown a system in another embodiment, in which a plurality of detection area memories 47*a* to 47*n* are connected in parallel between a detection area setting means 46 and abnormality discriminating means which are similar to those in the embodiment of FIG. 4, and these memories 47*a* to 47*n* are connected at their output ends to a switching means 50. In the present embodiment, different warning demand levels are allocated to divided monitoring time zones, and different warning levels ranked in correspondence to the warning demand levels of the time zones are stored respectively in each of these detection area memories 47*a* to 47*n*. The switching means 50 is arranged to use or select one of contents stored in the plurality of detection area memories 47*a* to 47*n* in response to such external signal as a clock signal generated by a digital clock or timer at every set time, or illumination intensity signal sent from an illuminometer for measuring how the monitoring zone is light. When the system is used to supervise an art gallery, museum, exhibition hall or the like where the same monitoring zone is to be supervised with different warning levels of several ranks depending on the respective time zones in which the gallery is open and is closed, in such that, as shown in FIG. 10, only a limited area 46*a* covering articles being exhibited will be watched with several warning levels during the gallery opening time, but the entire gallery interior will be watched also with several warning levels during the gallery closed time with, for example, a gallery passage way 46*b* made to have a warning level of 0 during the gallery opening time but to have a warning level of 1 during the gallery closed time, the system allows a satisfactory result to be obtained.

Figure 11:
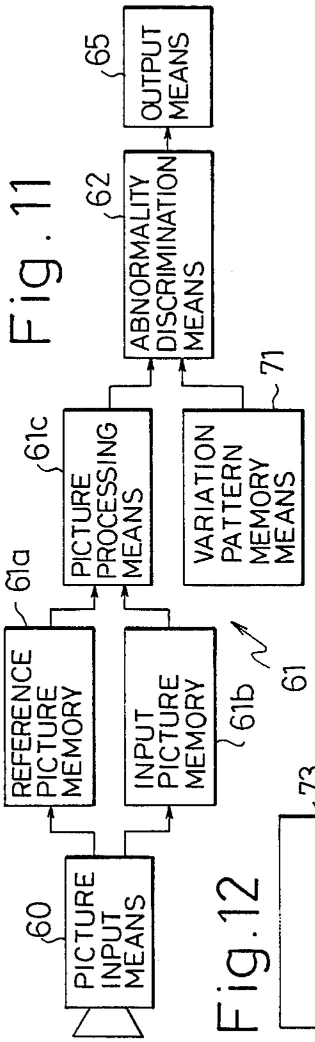
FIG. 11 is a block diagram of another embodiment of the system according to the present invention.

Shown in FIG. 11 is another embodiment in which an abnormality discrimination means 62 receives an output of a picture input means 60 through a picture processing section 61 which includes a reference picture memory 61*a*, an input picture memory 61*b* and a picture processing means 61*c*, and also receives an output of a variation pattern memory means 71. In the present instance, the variation pattern memory means 71 holds therein luminance variations of abnormal time as storage contents so that, when the output pattern of the picture processing section 61 corresponding to a luminance variation between the reference and input picture coincides with a variation pattern of the memory means 71, an output means 65 issues an abnormality informing output. According to the present embodiment, therefore, in addition to such discrimination by means of the output of the picture processing means 61 provided to the abnormality discrimination means 62 upon the luminance variation exceeding a certain threshold level as in the foregoing embodiments, a discrimination of abnormality or normality is executed according to the pattern of the output upon excess of the luminance variation over the threshold level, for a further improved supervisory accuracy.

Figure 12:
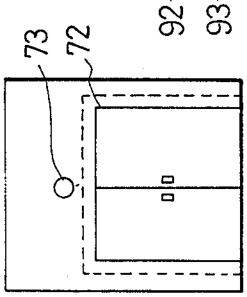
FIG. 12 is a diagram for explaining the usage of the system of FIG. 11.

When the monitoring zone is set, for example, with respect to an entrance door 72 of a house or building as shown in FIG. 12 and a normally flickering lamp 73 is provided immediately above the door 72, the picture processing section 61 issues a variation output to the abnormality discrimination means 62 but, so long as this output is of a pattern not stored in the variation pattern memory means 71, then the output means 65 performs no informing operation. In other words, the variation pattern memory means 71 may be so arranged as to preliminarily store the luminance variation upon opening of the door 72 and to issue an informing output from the output means 65. Other arrangement and operation of the embodiment of FIG. 11 are substantially the same as those of the foregoing embodiments.

Figure 13:
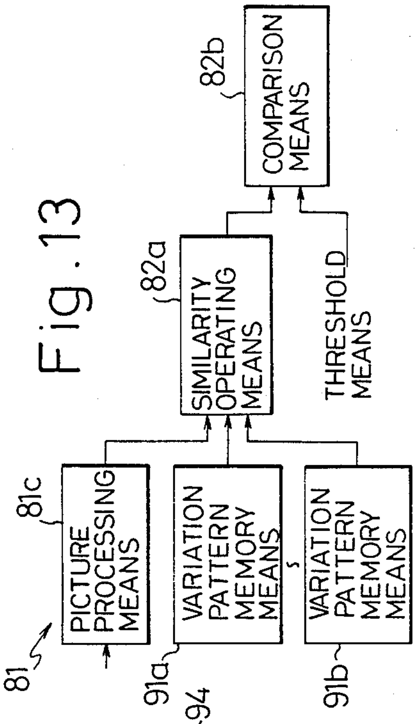
FIG. 13 is a block diagram at a major part of another embodiment of the system according to the present invention.

Referring to FIG. 13, there is shown another embodiment in which outputs of a picture processing means 81 as well as a plurality ("n") of variation pattern memory means 91*a* to 91*n* are provided to a similarity operating means 82*a* which forms part of an abnormality discrimination means. This operating means 82*a* compares the luminance variation output of the picture processing means 81 with respective pattern outputs of the "n" variation pattern memory means 91*a* to 91*n* and sends to a comparison means 82*b* the similarity value of the variation with respect to the most similar one of the "n" variation patterns. A predetermined threshold level is being provided to the comparison means 82*b* so that, when the luminance variation output is similar to one of the "n" variation patterns, the output is determined as not exceeding the threshold level and thus being normal, whereas any variation output not similar to any one of the "n" variation patterns is determined as exceeding the threshold level and thus being abnormal so that the comparison means provides an output to a subsequent-stage output means.

Figure 14:
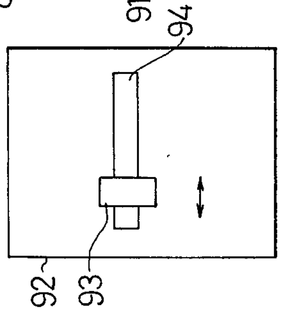
FIG. 14 is a diagram for explaining the usage of the system of FIG. 13.

When the system of FIG. 13 is used with, for example, a machine 92 a constituent member 93 of which reciprocates along a rail 94 as shown in FIG. 14, the system can operate in such that, so long as forward, backward (including every moment of displacement), halt and like operations of the member 93 are normal, any slight displacement of the member 93 due to a load imposed to the machine allows the luminance variation output to be similar to one of the variation patterns of the variation pattern means 91*a* to 91*n* so as not to have any abnormality informing output provided by the output means, whereas an irregular movement of the member 93 on the rail 94 due to any trouble in the machine 92 is determined to be abnormal. Other arrangement and operation of the embodiment of FIG. 13 are substantially the same as those of the foregoing embodiments.

Figure 15:
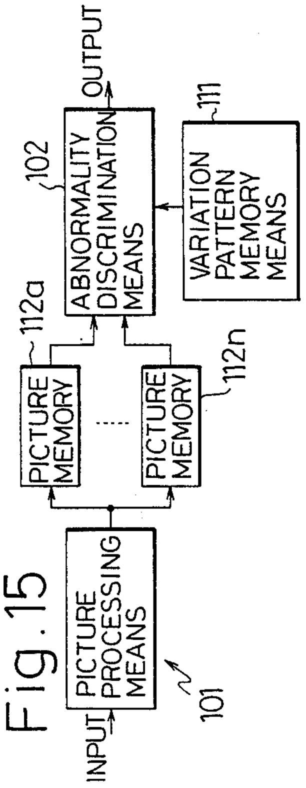
FIG. 15 is a block diagram at a major part of another embodiment of the system according to the present invention.

In a further embodiment shown in FIG. 15, picture memories 112*a* to 112*n* are inserted in parallel with each other between a picture processing means 101 and an abnormality discrimination means 102, and an output of a variation pattern memory means 111 is provided to the discrimination means 102. In this case, the picture memories 112*a* to 112*n* respectively store each of patterns of the luminance variation on the monitoring picture with time elapsing so that, when a variation output of the picture processing means 102 coincides with one of these patterns of the picture memories 112*a* to 112*n*, an output is provided to the abnormality discrimination means 102, coincidence of which output with contents stored in the variation pattern memory means 111 causes an abnormality discrimination output provided to the subsequent-stage output means.

Figure 16:
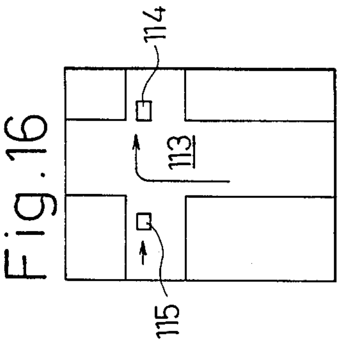
FIG. 16 is a diagram for explaining the usage of the system of FIG. 15.

In employing the system of FIG. 15 for monitoring, for example, running vehicles on a street crossing 113 as shown in FIG. 16 in which it has been so far impossible to judge, on the basis of only a momentary input picture from a picture input means, whether a car located at a position 114 has straightly crossed the crossing 113 from a position 115 or has turned right as shown by an arrow, the system according to the present invention makes this judgement possible in such that a picture of the car varying with time is sent to the picture memories 112*a* to 112*n* so that, when the varying picture does not coincide with any one of the picture memories 112*a* to 112*n*, a variation output is provided to the abnormality discrimination means 102. Since the discrimination means 102 is provided with the output of the variation pattern memory means 111 having the same sorts of storage contents as that in the embodiment of FIG. 6, coincidence of the varying picture sent to the discrimination means 102 with the variation pattern, an abnormality discrimination output is sent to the output means. When the turning right of the car at the crossing 113 shown in FIG. 16 is not allowed legally, the system of FIG. 15 can supervise the illegal right turning and inform it to a supervising officer. Other arrangement and operation of the embodiment of FIG. 15 are substantially the same as those of the foregoing embodiments.

Figure 18:
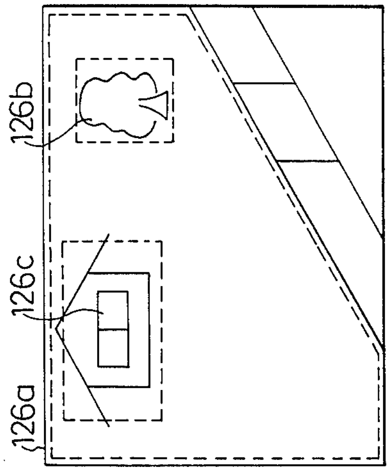
FIG. 18 is a diagram for explaining the usage of the system of FIG. 17.
Figure 17:
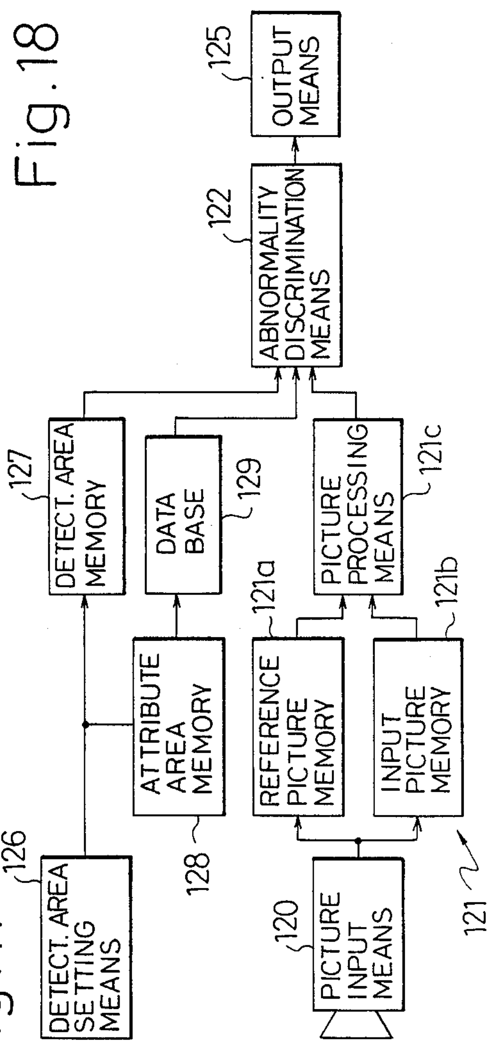
FIG. 17 is a block diagram of another embodiment of the system according to the present invention.

Referring to FIG. 17, there is shown an embodiment in which, as will be seen in its comparison with, for example, FIG. 4, an attribute area memory 128 and a data base 129 are inserted between an area setting means 126 and an abnormality discrimination means 122. In this case, the attribute area memory 128 stores such attribute areas as shown by dotted lines in FIG. 18 with respect to a tree 126*b* and house 126*c* in a monitoring zone 126*a* set for a residential ground, apart from the divided detection areas for the different warning levels, noticing in particular that a shake in the tree 126*b* or a flickering in illumination of the house 126*c* causes the luminance variation in the input picture but a monitoring object coming behind the tree 126*b* causes no luminance variation. The data base 129 stores characters corresponding to the respective attribute areas with respect to each of them stored in the attribute area memory 128. Since the knowledge stored in the data base 129 is provided to the abnormality discrimination means 122 together with outputs of a detection area memory 127 and of a picture processing means 121, any error resulting from the luminance variation caused by the shake of the tree or by the flickering of the house illumination or the absence of such variation caused by the object coming behind the tree within the monitoring zone can be compensated for. Other arrangement and operation of the embodiment of FIG. 17 are substantially the same as those of the foregoing embodiments.

Figure 19:
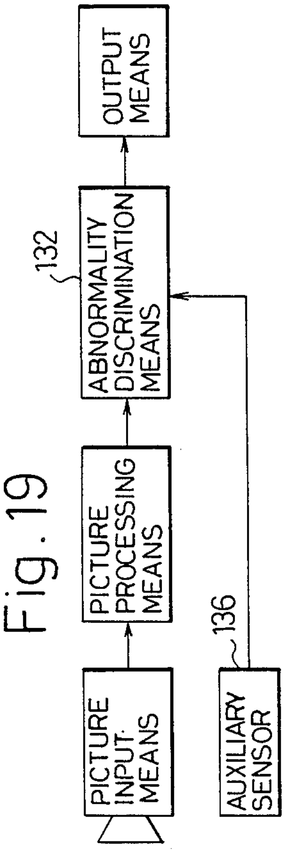
FIG. 19 is a block diagram of another embodiment of the system according to the present invention.

In an embodiment shown in FIG. 19, an output of an auxiliary sensor 136 is provided to an abnormality discrimination means 132, as will be clear when compared with the arrangement of FIG. 1. As the auxiliary sensor 136, such a human body sensor as an infrared ray sensor, an ultrasonic sensor or the like may be employed to detect the object coming behind the tree within the monitoring zone of FIG. 18, thus improving the monitoring accuracy. Other arrangement and operation of the embodiment of FIG. 19 are substantially the same as those of the foregoing embodiments.

Figure 20:
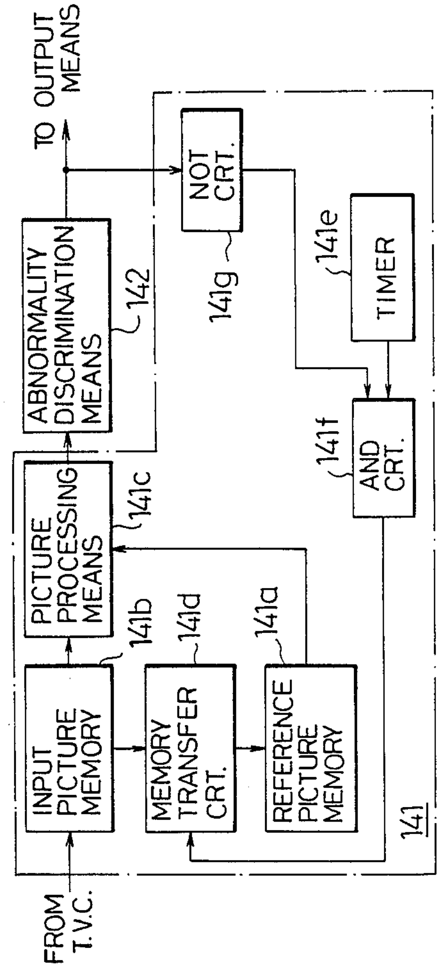
FIG. 20 is a block diagram at a major part of another embodiment of the system according to the present invention.
Figure 21:
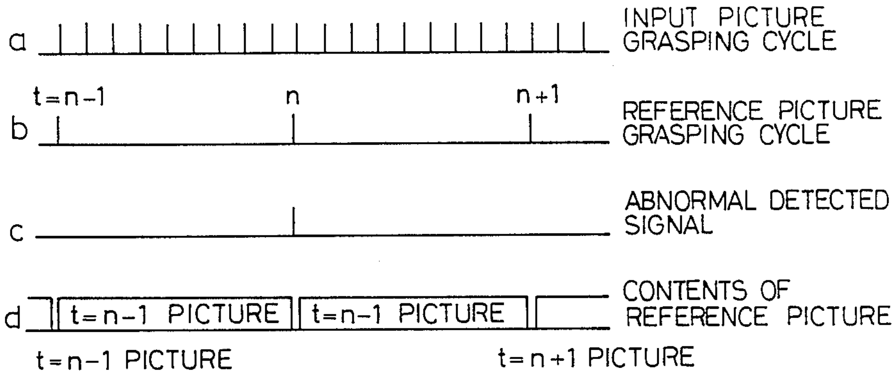
FIG. 21 is a timing chart for explanation of the operation of the system of FIG. 20.

Shown in FIG. 20 is another embodiment, in a picture processing section 141 of which a memory transfer circuit 141*d* is inserted between an input picture memory 141*b* and a reference picture memory 141*a*, an output of the latter of which is provided to a picture processing means 141*c*. The memory transfer circuit 141*d* receives an output of an AND circuit 141*f* which in turn receives an output of a timer 141*e*. Also provided to the AND circuit 141*f* is an output of a NOT circuit 141*g* which receives an output of an abnormality discrimination means 142. Referring also to FIG. 21, an input picture is applied to the input picture memory 141*b* at a cycle shown in FIG. 21*a*. When the picture processing means 141 generates no variation output of a predetermined level, the output of NOT circuit 141*g* is applied to the AND circuit 141*f* which in turn sends a transfer command signal to the memory transfer circuit 141*d* in response to each of outputs from the timer 141*e* to thereby transfer every picture from the input picture memory 141*b* to the reference picture memory 141*a*, whereby the reference picture in the reference picture memory 141*a* is renewed at a cycle shown in FIG. 21*b* and applied to the picture processing part 141*c* until the reference picture is renewed next, so that the latest normal reference picture will be obtained. When the abnormality discrimination means 142 discriminates the output of the picture processing means 141 to be abnormal, the means 142 generates an output. Accordingly, the output of the NOT circuit 141*g* is not provided to the AND circuit 141*f* and no transfer command signal is supplied from the AND circuit 141*f* to the memory transfer circuit 141*d*. As seen in FIGS. 21*c* and 21*d*, therefore, the reference picture in the reference picture memory 141*a* is not renewed upon receipt of the abnormality discrimination output from the discrimination means 42.

In this abnormality supervising system of FIG. 20, in contrast to the case of the foregoing embodiments using as the reference picture the input picture entered at every interval of a relatively long time, the abnormality discrimination can be realized without failing to notice the luminance variation of a gradually moving object. Other arrangement and operation of the embodiment of FIG. 20 are substantially the same as those of the foregoing embodiments.

Figure 22:
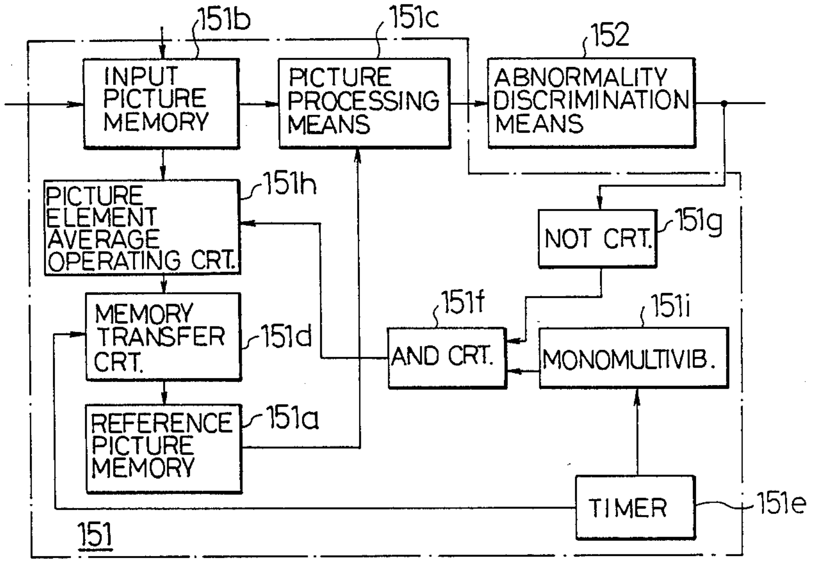
FIG. 22 is a block diagram at a major part of another embodiment of the system according to the present invention.

In another embodiment of FIG. 22, the renewal of reference picture is carried out with a higher reliability. That is, as will be clear when compared with FIG. 21, a picture-element average operating circuit 151*h* is inserted between an input picture memory 151*b* and a memory transfer circuit 151*d*, while an output of a timer 151*e* is independently provided to the circuit 151*d*, in a picture processing means 151. Also provided to the operating circuit 151*h* is an output of an AND circuit 151*f* which receives an output of an abnormality discrimination means 152 through a NOT circuit 151*g*, while the output of the timer 151*e* is provided to the AND circuit 151*f* through a monomultivibrator 151*i*. In the present embodiment, the output of the timer 151*e* is provided to the AND circuit 151*f* through the monomultivibrator 151*i* and the output pulse width of the timer 151*e* is expanded by the monomultivibrator 151*i*, so that a constant cycle output having a certain time width will be provided by the monomultivibrator 151*i* to the AND circuit 151*f*. In the illustrated embodiment, the timer pulse width is set to be, for example, an integer multiple of the input picture grasping cycle, and the average operating circuit 151*h* is operated in response to the output of the AND circuit 151*f*. When the pulse width is set to be 5 times as large as the input picture grasping cycle, therefore, the average operating circuit 151*h* averages five input pictures, so that an average picture of five input pictures is provided as a new reference picture to the reference picture memory 151*a* at intervals of every five input picture grasping cycles, and this renewing is carried out normally at intervals of several minutes so that the gradually moving object within the monitoring zone can be reliably grasped. Other arrangement and operation of the embodiment of FIG. 22 are substantially the same as those of the foregoing embodiments.

Figure 23:
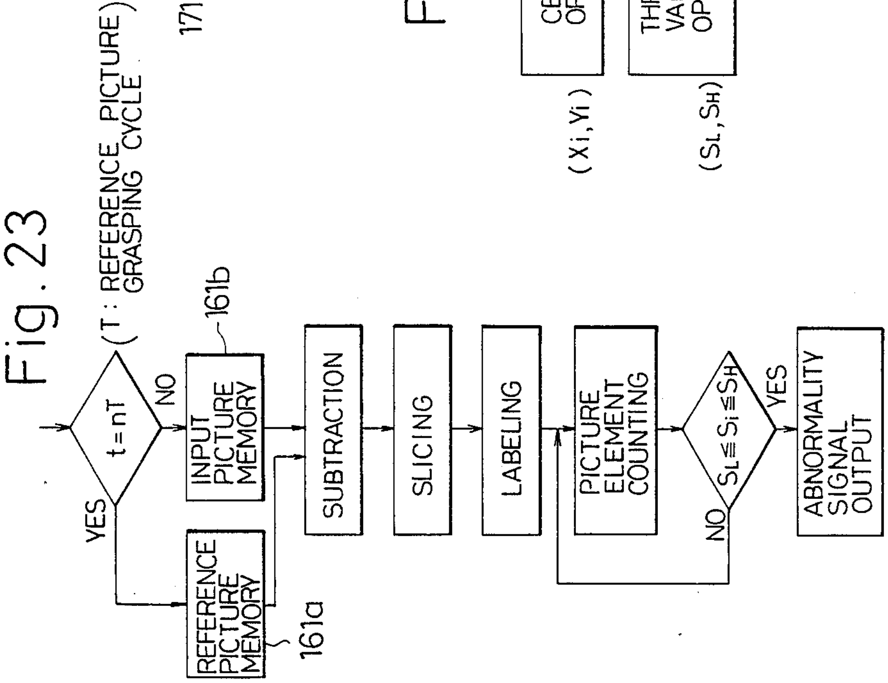

Referring to FIG. 23, there is shown an embodiment in which an area discriminating function for an object varying in its luminance is additionally provided to, for example, the picture processing means of FIG. 1. That is, in a picture processing means 161, an input picture is provided to a reference picture memory 161*a* at intervals of a renewing period $t=nT$ (T being the reference picture grasping cycle) to be subjected to an inter-picture-element subtraction with respect to an input picture from an input picture memory 161*b*. When a luminance difference obtained through the subtraction exceeds a predetermined value, a corresponding luminance variation is converted to a binary picture and then labeled. Then, the number of elements of such labeled pictures in each cluster is counted, that is, the area of each cluster is calculated and then compared with a preset threshold area. When there is such a cluster that has an area satisfying an expression $S_L \leqq S_i \leqq S_H$, wherein $S_L$ is the lower threshold value of the set area, $S_H$ is the upper threshold value of the set area and $S_i$ is the area of an i-th cluster, an abnormality output signal is issued. With the above area discriminating arrangement of the present invention, any luminance variation only due to the shake of a tree located within the monitoring zone, falling rain or snow, flickering of illumination or the like will not be discriminated as being an abnormality, so as to effectively prevent any erroneous operation. Other arrangement and operation of the embodiment of FIG. 23 are substantially the same as those of the foregoing embodiments.

Figure 24:
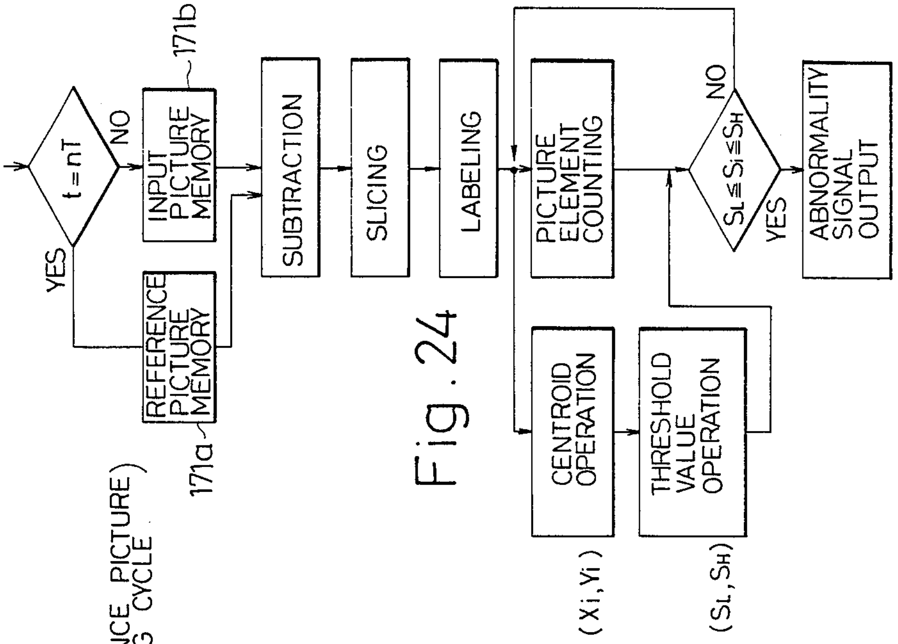
FIGS. 23 and 24 are flowcharts of further different embodiments of the system according to the present invention.
Figure 25:
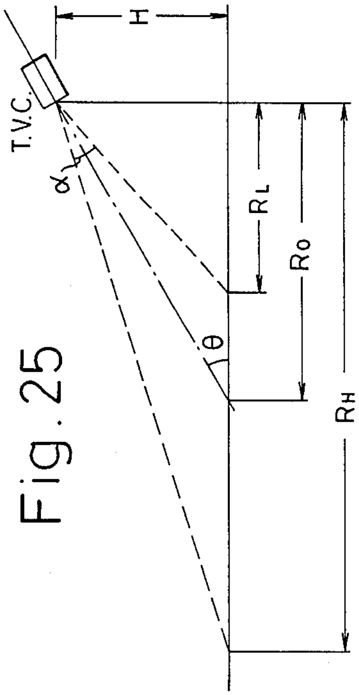
FIG. 25 is an installation diagram of a TV camera used in system of FIG. 24.

An embodiment shown in FIG. 24 has an arrangement for discriminating the area of an object with a higher reliability. As will be clear when compared with FIG. 23, the number of elements in each cluster of the labeled picture is counted to calculate the cluster area as well as its centroid, the threshold value is operated according to the centroid coordinates for each cluster, and it is judged whether or not the area satisfies the expression $S_L \leqq S_i \leqq S_H$ in the same manner as in the embodiment of FIG. 23. With a picture pickup TV camera TVC of an input picture means installed, for example, at a high position as directed obliquely downwardly to secure a broad monitoring zone as shown in FIG. 25, it normally happens that an object closer to the camera TVC is monitored to be larger on the video screen but is monitored to be smaller when remote from the camera though the object per se does not change its size, but the present embodiment used in such situation can effectively correct such magnitude difference on the video screen between the pictures of the identical object located close to and remote from the camera.

Figure 26:
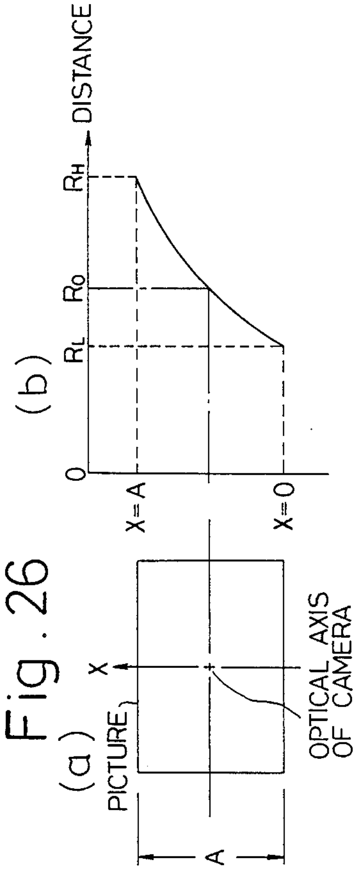
FIG. 26 is a diagram for explaining relationship between the coordinate on monitoring video screen and actual distance of monitoring object in the system of FIG. 24.

The correcting operation of the present embodiment will be detailed with reference to FIGS. 25 and 26. A distance $R_o$ between the vertical position of the picture pickup camera TCV on the ground surface and an intersecting point of the optical axis of the camera with the ground surface is found in accordance with an equation $R_o = H \cdot \operatorname{cosec} \theta$, where H is the installation height of the camera TVC and $\theta$ is an angle defined by the optical axis and the ground surface. Where the visual field angle of the camera TVC is $\alpha$, an actual upper limit distance $R_H$ as well as an actual lower limit distance $R_L$ of the monitored picture can be obtained by means of equations $R_H=H\cdot\text{cosec}\ (\theta-\alpha/2)$ and $R_L=H\cdot\text{cosec}\ (\theta+\alpha/2)$, respectively. When it is assumed as shown in FIG. 26a, on the video screen that an X axis is taken to intersect the optical axis of the camera and the X coordinate values of the lower and upper monitoring screen limits are O and A, respectively, an actual distance R corresponding to a point on the screen is found in accordance with an equation $R=H\cdot\text{cosec}\ [\theta-\alpha\{X/(A-\frac{1}{2})\}]$. Since the size of an object on the screen of the monitoring zone is reverse proportional to the square of the actual distance, the magnitude difference on the screen between the pictures of the identical object located close to and remote from the camera is corrected, in the area comparison, by multiplying by $1/R^2$ the lower and upper limit threshold values $S_L$ and $S_H$ of the set area on the basis of the calculated centroid position for each cluster and then operating the equation $S_L \leqq S_i \leqq S_H$. In practice, the picture processing means may preliminarily be provided with a memory which stores such a conversion table of coordinate/distance correction coefficients as presented in FIG. 26b. Other arrangement and operation of the embodiment of FIG. 24 are substantially the same as those of the foregoing embodiments.

Figure 27:
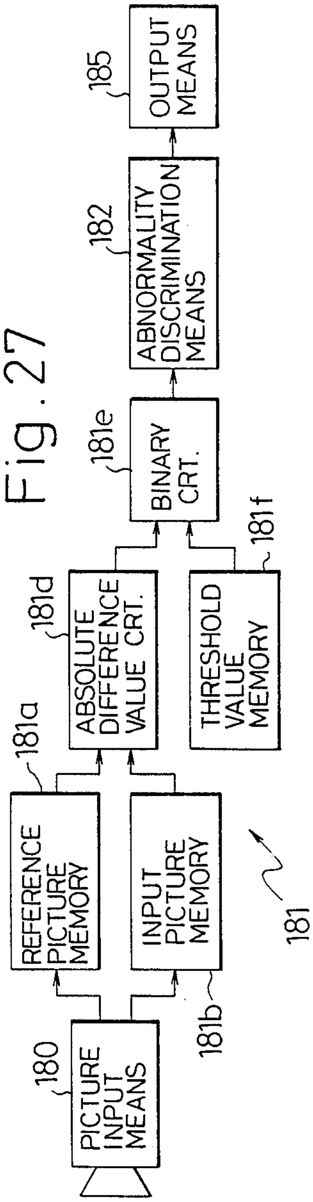
FIG. 27 is a block diagram of another embodiment of the system according to the present invention.

An embodiment shown in FIG. 27 is provided with an automatic setting function for the binary conversion of the luminance variation. In this case, as will be clear when compared with, for example, the embodiment of FIG. 4, a picture processing means 181 is so formed that outputs of a reference picture memory 181a and input picture memory 181b are provided to an absolute difference value circuit 181d, an output of the latter of which is provided to a binary circuit 181e. An output of a threshold value memory 181f is provided also to be binary circuit 181e an output of which is provided to an abnormality discrimination means 182. In the illustrated embodiment, the absolute value of a variation corresponding to a difference between the reference and input pictures is calculated in the absolute difference value circuit 181d. The threshold value stored in the memory 181f is calculated on the basis of "N" input pictures, by selectively setting the luminance variation in normal state, with a utilization of the fact that the luminance variation in abnormal state is considerably smaller than that in the normal state.

Figure 28:
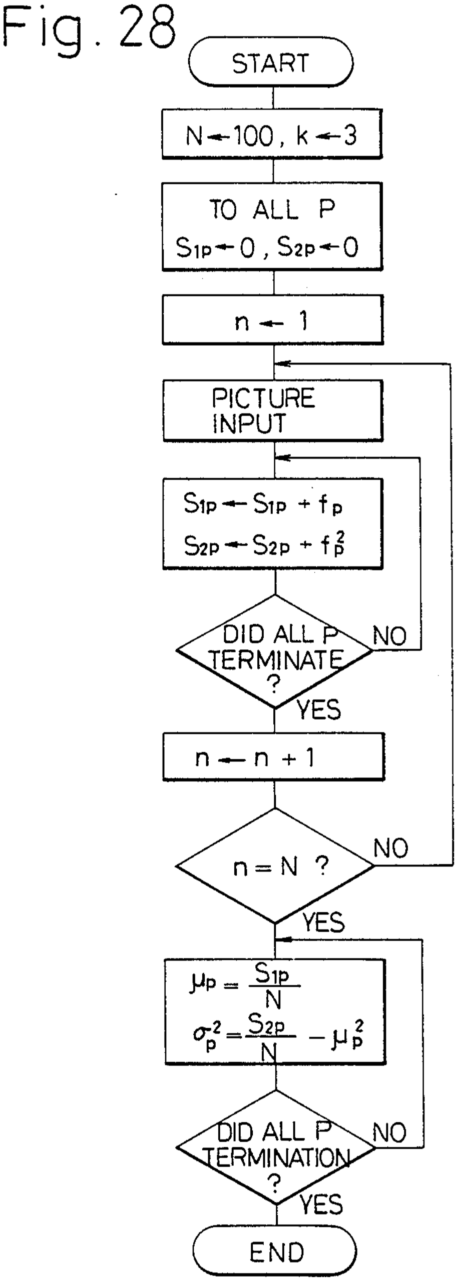
FIG. 28 is a flowchart of threshold calculation in the system of FIG. 27.

The threshold value calculation is carried out preferably in accordance with a flowchart of FIG. 28. In this case, it is desirable to set the input picture number N for the threshold value calculation to be, for example, 100 and quantity k which will be obtained in accordance with such formulas as follows to be 3. In obtaining the quantity k, it is assumed that the luminance at a coordinate point P upon receipt of i-th input picture is fip. When the luminance variation values in the absence of any abnormality are distributed without any remarkable fluctuation and N is sufficiently large, variables $\mu p$ and $\sigma p$ for obtaining $S_1p$ and $S_2p$ are obtained also from the formulas as follows:

$$\mu p = (1/N) \sum_{i=1}^{N} fip^2 - \mu p^2,\ \sigma p^2 = (1/N) \sum_{i=1}^{N} fip^2 - \mu p^2$$

Here, a following formula is made to be satisfied, at a probability of $(1-\psi)$, $$|fp-\mu p| < k\sigma p$$

so as to obtain k, with the luminance of an optional input picture in normal state assumed as fp. With the N input pictures in normal state provided, the variables $\mu p$ and $\sigma p$ are obtained by means of these formulas, such a reference picture that will have the luminance of $\mu p$ at a coordinate point P, and the threshold value is set to be $k\sigma p$ obtained by the above operation. Then, the probability at which the luminance variation at a point Q where the variation exceeding the threshold value has taken place in normal state is known to be $\psi$, while it is possible to lower $\psi$ to a negligible level by optimumly setting k, that is, the probability of erroneous operation occurrence can be made less than 1 by setting k to be, for example, 3. It will be appreciated that an automatic setting function may be provided for performing the binary conversion of the luminance variation. Other arrangement and operation of the embodiment of FIG. 27 are substantially the same as those of the foregoing embodiments.

Figure 29:
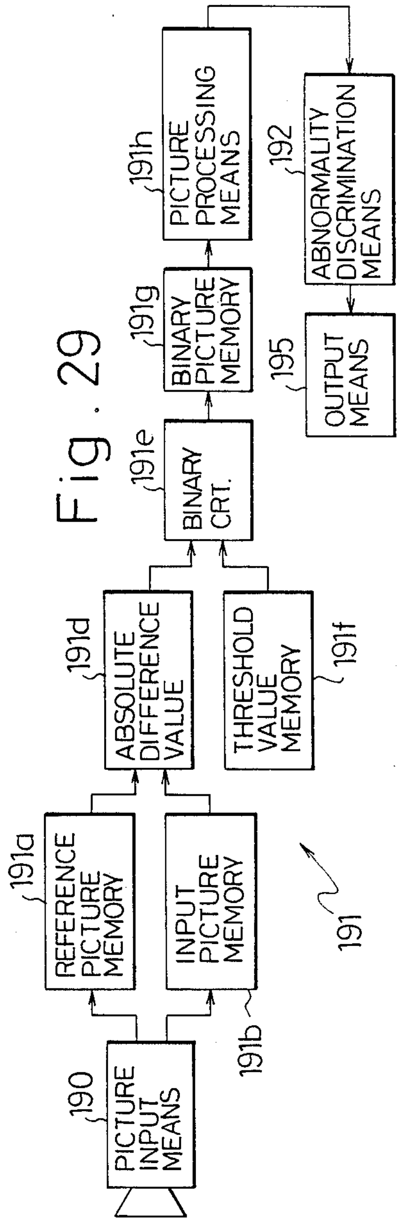
FIG. 29 is a block diagram of another embodiment of the system according to the present invention.

In another embodiment shown in FIG. 29, as seen in comparison with the embodiment of FIG. 27, a binary picture memory 191g and a picture processing means 191h are inserted between a binary circuit 191e and an abnormality discrimination means 192, so that a binary picture stored in the binary picture memory 191g is subjected to a noise processing and the like at the picture processing means 191h, before being sent to the abnormality discrimination means 192. While there is a possibility that an output of the binary circuit 191e may have an error of $\psi$, as has been explained in connection with the embodiment of FIG. 27, this error can be further reduced in such manner that, if $\psi$ is, for example, an abnormal output caused by the luminance variations which occurring at all points within the monitoring zone, a processing of a so-called isolated point removal is performed at the picture processing means 191h. Other arrangement and operation of the embodiment of FIG. 29 are substantially the same as those of the foregoing embodiments.

Figure 30:
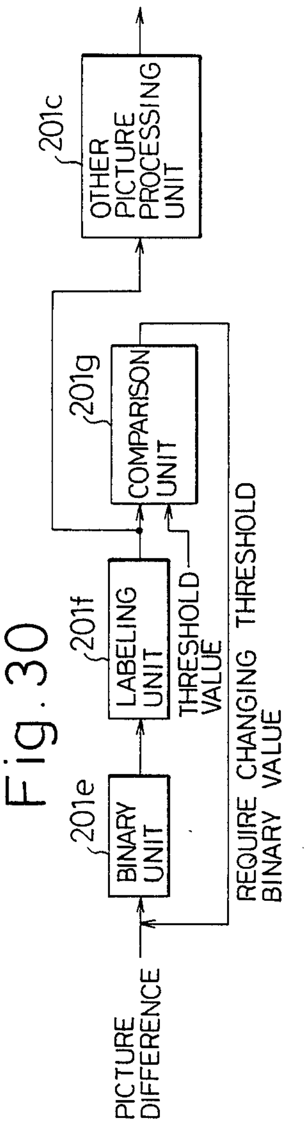
FIGS. 30 and 31 are block diagrams of other different embodiments of the system according to the present invention.

Referring to another embodiment as in FIG. 30, the luminance variation in the input picture with respect to the reference picture is converted to a binary picture by means of a predetermined first threshold value $S_a$ at a binary unit 201e, and this binary picture is labeled at a labeling unit 201f. With respect to every cluster in the labeled pictures, a comparison unit 201g counts the number of objects having an area of more than a predetermined second threshold value $S_b$ and compares the counted value with a third threshold value $S_c$. In the case where the counted object value exceeds the third threshold value $S_c$, the first threshold value $S_a$ for the binary conversion is changed so that the binary conversion is carried out again for the labeling. Here, other picture processing unit 201c corresponds to the picture processing section in the foregoing embodiments. According to the present embodiment, therefore, it is made possible to exclude, from the objects for providing the abnormality output, such object as rain or snow which accompanying a luminance variation continuous but of a small luminance difference with respect to the background. Other arrangement and operation of the embodiment of FIG. 30 are substantially the same as those of the foregoing embodiments.

Figure 31:
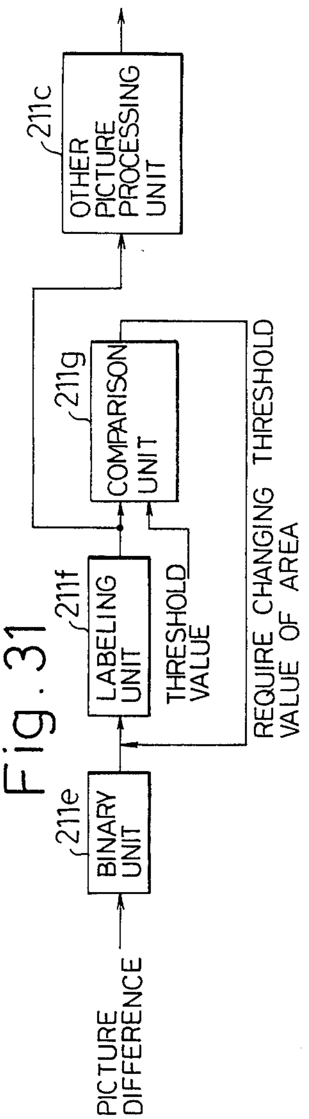

In another embodiment shown in FIG. 31, as seen in comparison with the embodiment of FIG. 30, the count at a comparison unit 211g exceeding the third threshold value $S_c$ will cause the second threshold value $S_b$ to be changed to provide the same operation as in the embodiment of FIG. 30. Other arrangement and operation of the embodiment of FIG. 31 are substantially the same as those of the foregoing embodiments.

Figure 32:
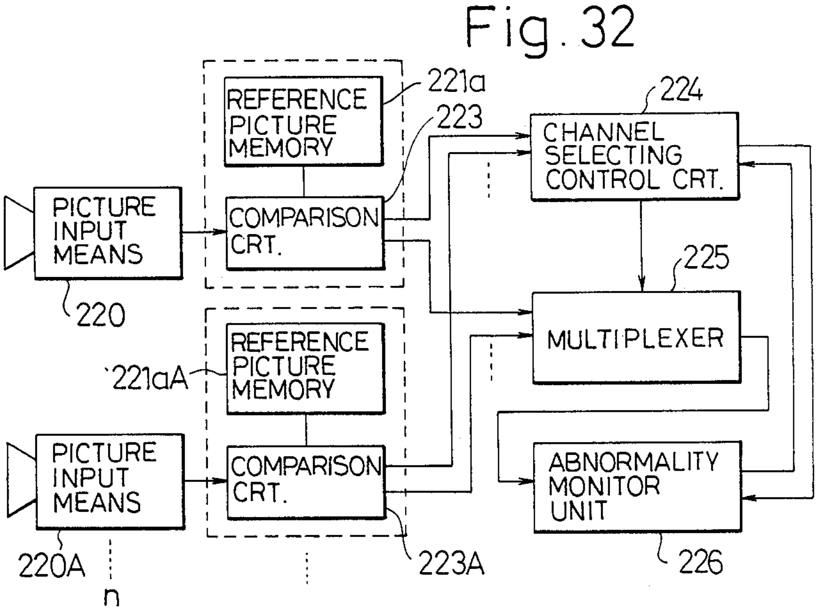
FIGS. 32 and 33 are block diagrams of further different embodiments of the system according to the present invention.

Referring to FIG. 32, there is shown an embodiment which comprises multichannel picture input means 220, 220A, . . . 220N respectively connected to each of pairs of reference picture memories 221a, 221aA, . . . 221aN and comparison circuits 223, 223A, . . . 223N, the latter circuits respectively comparing the input picture with the reference picture in respect of their luminance. Outputs of the comparison circuits 223, 223A, . . . 223N are sent respectively through an independent line to a common channel selecting control circuit 224 and a common multiplexer 225. In the channel selecting control circuit 224, an incoming luminance variation output indicative of an abnormality from, for example, the comparison circuit 223I associated with the I-th picture input means 220I causes a select signal sent to the multiplexer for selecting the I-th picture input means 220I. The channel selecting control circuit 224 and multiplexer 225 are connected to an abnormality monitor unit 226 so that, as soon as the select signal is sent from the channel selecting control circuit 224 to the multiplexer 225, the multiplexer is made to know that the I-th comparison circuit 223I has been selected and to be provided with the luminance variation output from the I-th comparison circuit 223I and passed through the multiplexer 225.

The abnormality monitor unit 226 comprises such picture processing section of the picture input means, abnormality discrimination means and output means as in the foregoing embodiments, and executes the similar picture processing, abnormality discrimination and informing operation to those in the foregoing embodiments. The unit 226 also commands the channel selecting control circuit 224 to have the select signal for the I-th comparison circuit 223I transmitted continuously to the multiplexer 225 until the abnormality discrimination of the picture from the I-th comparison circuit 223I is completed, and to have such signal transmission terminated upon completion of the abnormality discrimination.

In the present embodiment, only outputs of the comparison circuits which showing the luminance variation are processed, so that any term for which the supervision is disabled can be remarkably shortened as compared with the case of a time sharing system which performs the supervision with the respective picture input means sequentially switched, and it is made possible to effectively prevent any overlooking of abnormal pictures from other picture input means than that of which the picture is being processed.

Figure 33:
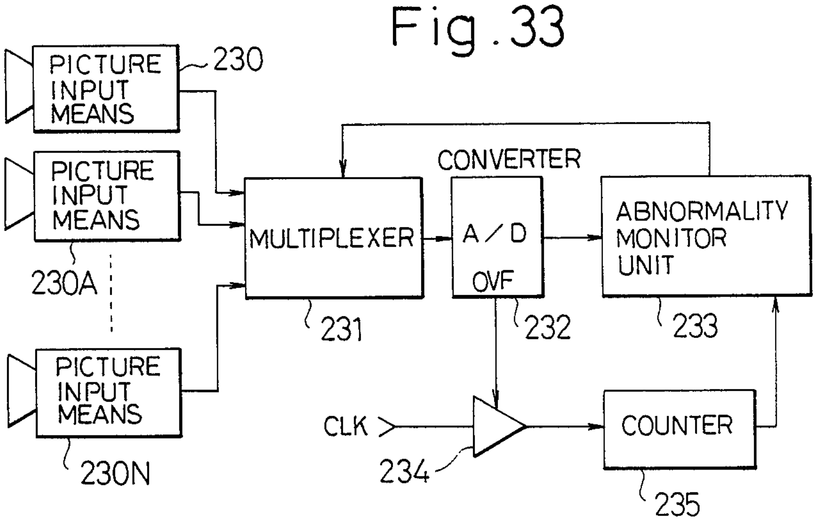

Referring to FIG. 33, there is provided a multichannel supervising system according to an embodiment of the present invention, which generates no abnormality discrimination output even upon occurrence of such pulsating light as lightning or the like. More specifically, picture input means 230, 230A, . . . 230N are provided in multichannel, so that their input pictures are provided to a common multiplexer 231, which provides these input pictures through an A/D converter 232 to an abnormality monitor unit 233. In the present embodiment, the abnormality monitor unit 233 comprises the same picture processing means, abnormality discrimination means and output means as those in the foregoing embodiments, and performs the same picture processing, abnormality discrimination and informing operation also as in the foregoing embodiments. The converter 232 is so provided that, upon receipt of an input larger than a predetermined value, an overflow signal OVF is provided to a gate circuit 234. Also applied to the gate circuit 234 is a clock signal CLK. When the gate circuit 234 receives the overflow signal OVF, the gate is turned ON to send clock signals CLK to a counter 235 for their counting. When the count of the clock signals reaches a predetermined level, the counter 235 provides its output to the abnormality monitor unit 233 to have its abnormality discrimination terminated. The multiplexer 231 causes the pictures from the picture input means sent sequentially to the A/D converter 232.

In the present embodiment, a receipt into at least one of the picture input means 230, 230A, . . . 230N of such pulsating light as lightning causes the luminance variation sent through the multiplexer 231 to the A/D converter 232 to be raised to a level higher than a predetermined value in the converter, whereby the signal OVF is provided from the A/D converter 232 to the gate circuit 234, upon which the clock signals CLK are provided to the counter 235 through the gate circuit 234 so that, when the count at the counter 235 reaches the predetermined value, the discrimination terminating signal is sent from the counter 235 to the abnormality monitor unit 233 to inhibit the informing operation by the output means of the unit 233, for preventing any erroneous operation from being caused by such light.

Figure 34:
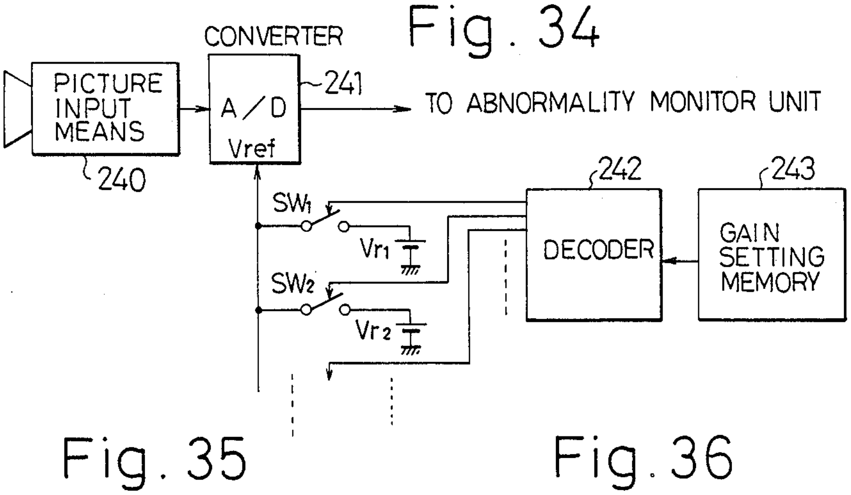
FIG. 34 is a block diagram at a major part of still another embodiment of the system according to the present invention.

In another embodiment shown in FIG. 34, an A/D converter 241 is inserted between a picture input means 240 and an abnormality monitor unit which includes such picture processing means, abnormality discrimination means and output means as shown in FIGS. 32 and 33. The A/D converter 242 is provided for an application thereto of a reference voltage $V_{ref}$ from a plurality of reference voltage source $V_{r1}$, $V_{r2}$, . . . $V_{rn}$ through analog switches $SW_1$, $SW_2$, . . . $SW_n$. In the illustrated embodiment, the analog switches $SW_1$ to $SW_n$ are connected to a common decoder 242 which receives data from a gain setting memory 243 and operates to make one of the analog switches $SW_1$ to $SW_n$ through its one output line. Used as the gain setting memory 243 is, for example, a graphic memory for correspondence to the picture elements in 1:1 relationship so as to render $512\times512$ picture elements to be $512\times512\times m$ bits. In practice, the m bits are determined by the number of areas to be set. For example, when 8 areas are set in the monitoring zone, m is set to be 3. The data in the memory 243 can be provided thereto by setting any optional number of the areas with use of a graphic tablet or a light pen.

Figure 35:
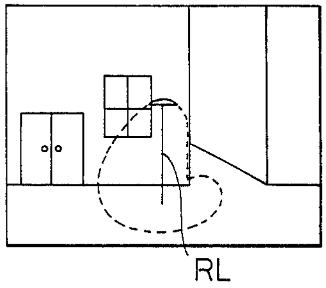
FIG. 35 shows an example of an input picture in the system of FIG. 34.
Figure 36:
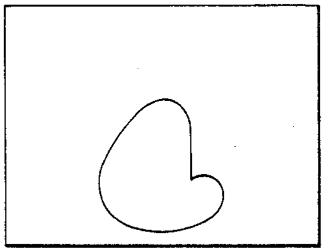
FIG. 36 shows an example of memory contents in the system of FIG. 24.

Referring to FIGS. 35 to 36, it is here intended to monitor such a street corner as in FIG. 35 which including a street lamp RL, by means of the picture input means 240. In this case, such area in the vicinity of the street lamp as enclosed by a dotted line provides a higher luminance on the monitored picture. When this information on this area is preliminarily provided in the gain setting memory 243 as shown in FIG. 36, the gain on such area of the higher luminance can be reduced by selectively switching the reference voltage to the A/D converter by means of the analog switches receiving a command from the decoder 242 with respect to input picture elements of the particular area, so that the entire input picture including the particular area of the higher luminance can be monitored with a uniform sensitivity.

Figure 37:
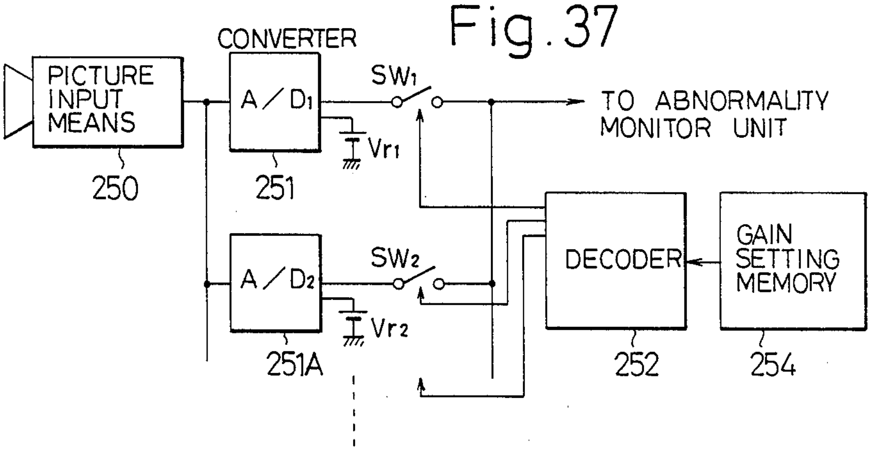
FIGS. 37 and 38 are block diagrams of other different embodiments of the system according to the present invention.

Shown in FIG. 37 is an embodiment in which, as seen in comparison with FIG. 34, a plurality of A/D converters 251, 251A, . . . 251N as well as analog switches $SW_1$, $SW_2$, . . . $SW_n$ respectively associated with the A/D converters are connected between a picture input means 250 and an abnormality monitor unit, the switches $SW_1$ to $SW_n$ being connected to a decoder 252 which functions, as in the embodiment of FIG. 34, to receive data from a gain setting memory 254 and selectively make one of the analog switches through one of output lines of the decoder. According to the present embodiment, a digital signal can be switched so that any noise can be reduced. Other operation of the embodiment of FIG. 37 is substantially the same as that of the embodiment of FIG. 34.

Figure 38:
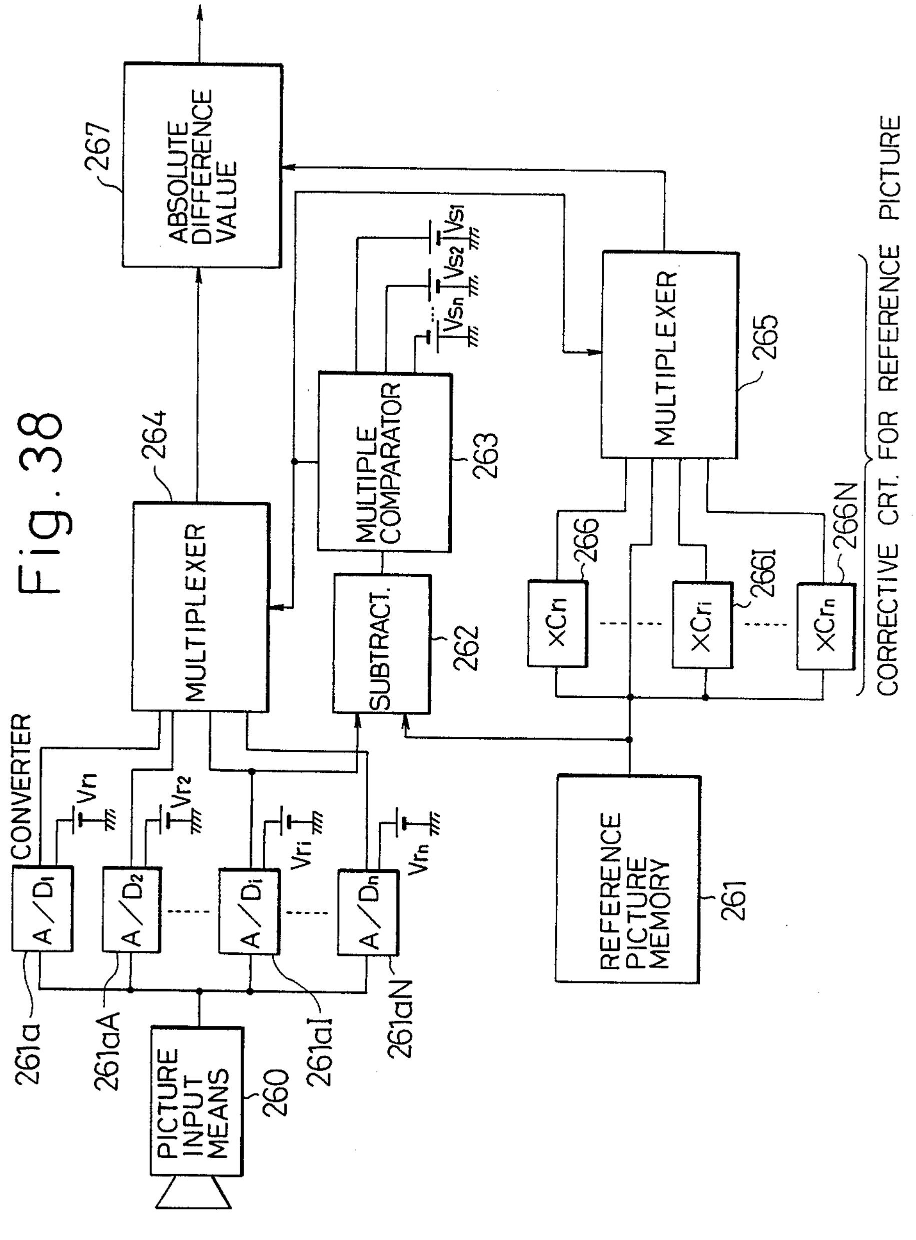

In an embodiment shown in FIG. 38, a picture input means 260 is connected to a plurality of A/D converters 261*a*, 261*a*A, . . . 261*a*N which are coupled respectively independently to each of reference voltage sources $V_{r1}$, $V_{r2}$, . . . $V_{rn}$ and are respectively set to have each of different gains. It is assumed here that the I-th A/D converter 261*a*I has an intermediate gain, i.e., standard gain and the picture input means receives a normal picture input, then the input picture is sent through the A/D converter 261*a*I to a subtractor 262 to calculate the luminance variation with respect to the reference picture sent from a reference picture memory 261. An output of the subtractor 262 is provided to a multiple comparator 263 connected to a plurality of reference voltage sources $V_{rs1}$, $V_{rs2}$, . . . $V_{rsn}$ to have "n" threshold values. The comparator 263 determines the extent of the gain modification with respect to the variation output of the subtractor 262 and provides a command to a gain selecting multiplexer 264 connected to the A/D converters 261*a*, 261*a*A, . . . 261*a*N to select one of the outputs of the converters. The gain modification output of the comparator 263 is also provided to another multiplexer 265 for modification of reference picture, which multiplexer 265 in turn receives multiplication outputs of a plurality of multipliers 266, 266A, . . . 266N receiving the output of the reference picture memory 261. In these multipliers, the reference picture has been multiplied by the same coefficients as the mutual gain modification ratios of the A/D converters 261*a*, 261*a*A, . . . 261*a*N so that, when the gain modification output is provided from the multiple comparator 263 to the multiplexer 265, one of the multipliers having the coefficient corresponding to the gain of selected one of the A/D converters will be selected. The selected gain modification input picture at the gain selecting multiplexer 264 and the selected multiplied picture of the gain-modification-ratio at the reference picture correction multiplexer 265 are both sent to an absolute difference value circuit 267 to calculate the absolute value of a difference between these pictures. It will be appreciated that an output of the absolute difference value circuit 267 is sent to such binary circuit, abnormality discrimination means and output means as in FIGS. 27 and 29.

When, in the present embodiment, there occurs in the input picture of a monitoring zone an abrupt luminance variation due to, for example, a car's headlight, the output of one of the A/D converters having a low gain value responsive to light level of the headlight as well as the output of one of the multipliers having the same coefficient as the gain modification ratio of the selected A/D converter are sent respectively through the multiplexers 264 and 265 to the absolute difference value circuit 267 to calculate the absolute value of the difference for processing the picture at the subsequent stage. That is, when the gain of the A/D converter is selected to be 0.8 multiplication, gain correction of 0.8 is realized also with respect to the reference picture. Therefore, even the abruptly increased or decreased luminance of the input picture will cause the gain correspondingly increased or decreased, so that the monitoring can be carried out always with a uniform sensitivity over the entire input picture.

Figure 39:
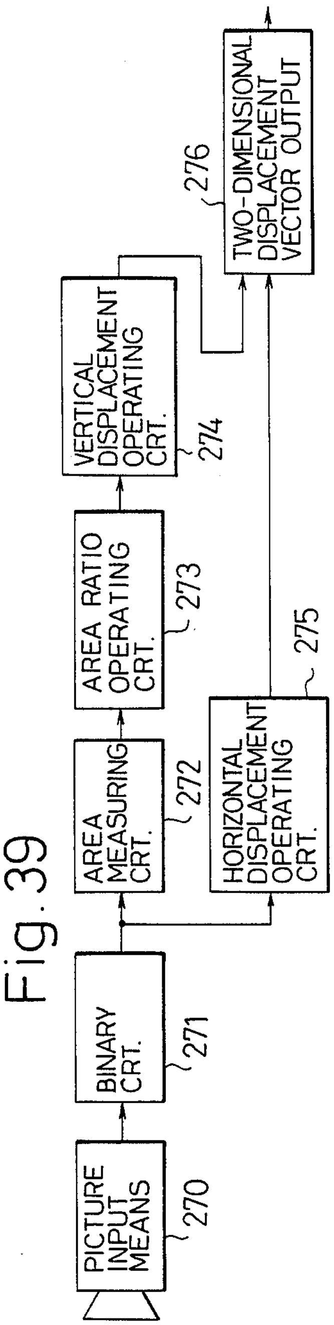
FIG. 39 is a block diagram of another embodiment of the system according to the present invention.

Shown in FIG. 39 is an embodiment which realizes the abnormality supervision by means of two-dimensional displacement vector. More specifically, an input picture of a picture input means 270 is converted to a binary picture at a binary circuit 271 and then sent to an area measuring circuit 272 which counts the number of picture elements in the binary picture having a value of "1" to determine the area $AR_1$ of a monitoring object and sends the area to an area ratio calculating circuit 273. In the illustrated embodiment, the area ratio calculating circuit 273 is holding an area $AR_0$ of the binary picture obtained from a previous input picture of the picture input means 270, so that a variation ratio between the previous picture area $AR_0$ and the input picture area $AR_1$, that is, $AR=|AR_1-AR_0|/AR_0$ is calculated in the circuit 273, and this calculated area ratio is sent to a vertical displacement calculating circuit 274 to determine a vertical displacement $\Delta X$ in accordance with an equation $$\Delta X = A \cdot \text{sgn}\,(AR_1 - AR_0) SQRT(\Delta AR)$$

wherein the term SQRT($\Delta$AR) is the square root of $\Delta$AR. The area variation is proportional to the square of a displacement seen in the object and, so long as the actual area of the object is assumed to be substantially constant, the area variation is proportional to a vertical displacement of the object. The term sgn $(AR_1-AR_0)$ is a sign function which has a value of +1 when $(AR_1-AR_0)$ is of a positive value of zero, or a value of −1 when $(AR_1-AR_0)$ is a negative value, whereby the vertical displacement $\Delta X$ is made to have a positive value when the object approaches the picture input means but to have a negative value when the object separates the picture input means 270. Further, the term A is a coefficient for convertion into the actual displacement of the object.

Figure 40:
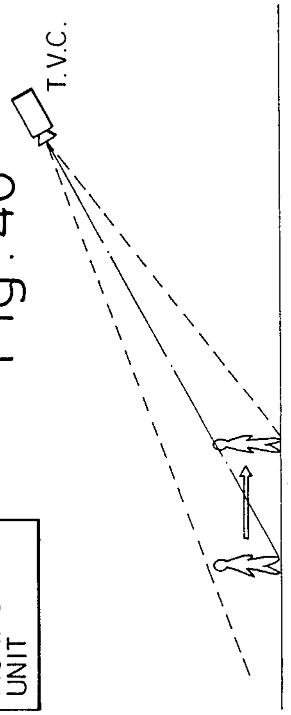
FIG. 40 is a diagram showing a picture pickup state of the system of FIG. 39.

On the other hand, the binary picture is also provided to a horizontal displacement calculating circuit 275 which determines the central position of the binary picture, as well as a difference between a horizontal position $Y_1$ of the input picture and a horizontal position $Y_0$ of the previous binary picture held at the circuit 275, that is, 66 $Y=Y_1-Y_0$ is obtained here. This output of the horizontal displacement calculating circuit 275 is provided, together with the above output of the vertical displacement calculating circuit 274, to a two-dimensional displacement vector output circuit 276 so that, even when the object approaches the picture input means 270 as shown in FIG. 40, the output circuit 276 provides a displacement vector.

Figure 42:
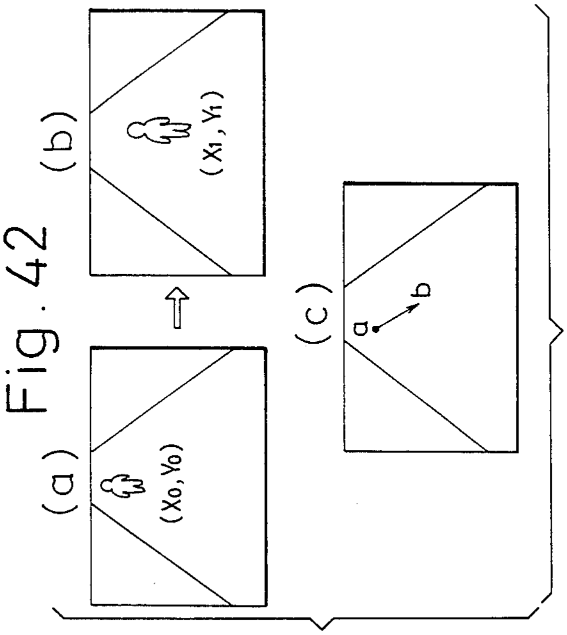
FIG. 42 is a diagram for explaining the operation of the foregoing embodiments as shown in the same manner as in FIG. 41.
Figure 41:
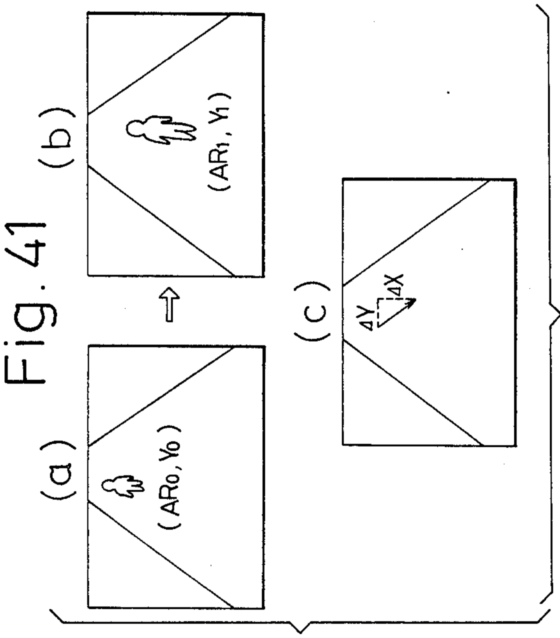
FIG. 41 is a diagram for explaining the operation of the system of FIG. 39.

Accordingly, such a displacement vector ($\Delta$X,$\Delta$Y) as shown in FIG. 41*c* can be calculated on the basis of such previous binary picture as shown in FIG. 41*a* and such latest binary picture as shown in FIG. 41*b*. While, in a system which calculates the displacing distance without using the area ratio for calculating the vertical position but only on the basis of the central position of the binary picture similarly to the horizontal position calculation as shown in, for example, FIGS. 42*a* and 42*b*, and which employs for monitoring the moving object in particular such TV camera directed obliquely downward as shown in FIG. 40, the displacing distance of the object is moving at a constant speed, such displacing distance can be measured always accurately according to the present embodiment. It should be understood that the displacement vector calculated in the above manner can be converted to a speed vector by dividing respective displacement vector components by the measuring time interval. The arrangement of the present embodiment may be effectively employed, for example, as a part of the picture processing means of FIG. 1.

Figure 43:
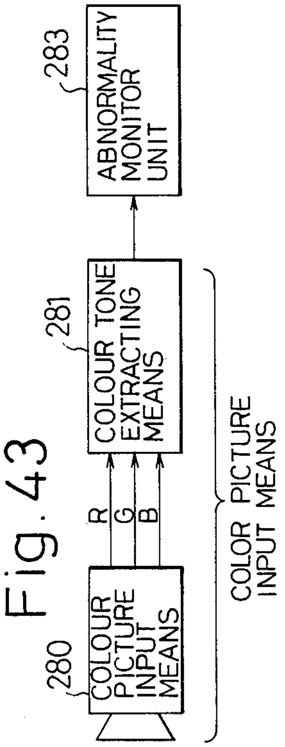
FIG. 43 is a schematic block diagram of another embodiment of the system according to the present invention.

In FIG. 43, there is shown an embodiment in which, as is clear in comparison with the embodiment of FIG. 1, a picture input means 280 includes such a picture pickup means as a color TV camera and sends three primary-color signals of red, green and blue to a color tone extracting means 281 which extracts hues for allowing such expressions as G/R, R/(R+G+B) and G/(R+G+B) possible and calculates the number of picture elements indicative of colors themselves not depending on the light level.

Figure 44:
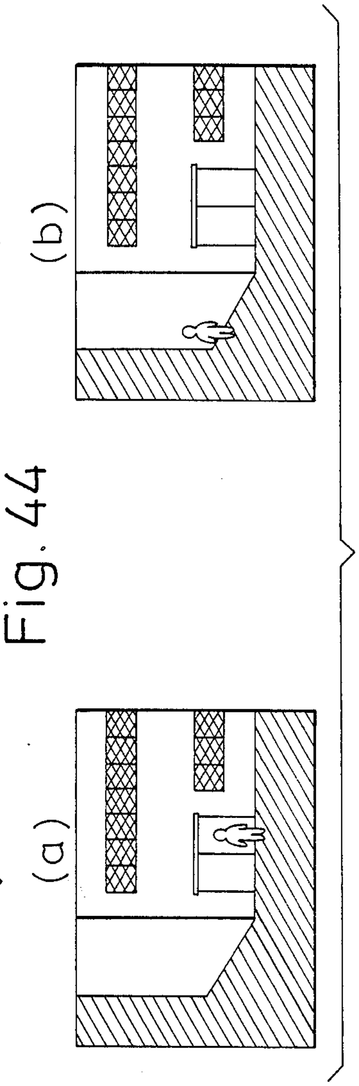
FIG. 44 is a diagram for explaining the operation of the system of FIG. 43.
Figure 45:
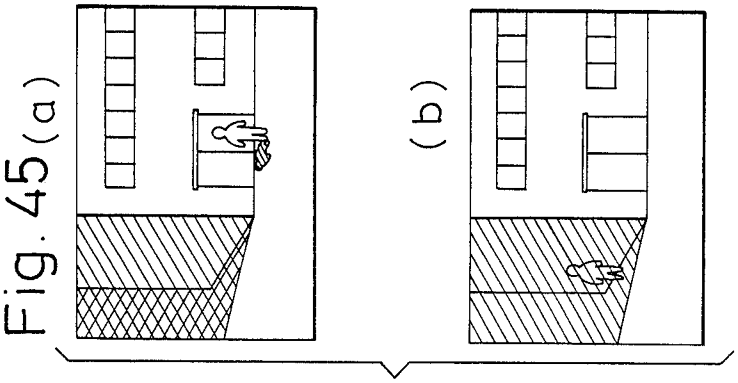
FIG. 45 is a diagram for explaining the operation of the foregoing embodiments as shown in the same manner as in FIG. 44.

An output of the color tone extracting means 281 is sent to an abnormality monitor unit 283 including, for example, such picture processing means, abnormality discrimination means and output means as shown in the foregoing embodiment of FIG. 27 to execute therein the same picture processing, abnormality discrimination and informing operation as those of the foregoing embodiment. As will be seen in comparison of FIGS. 44*a* and 44*b* showing an example of the input picture through the hue extraction in the present embodiment with FIGS. 45*a* and 45*b* showing an example of monochromatic input picture according to the foregoing embodiment, it becomes impossible in the monochromatic input picture to monitor an object which enters into a shade of a building due to daylight since the luminance variation is very slight in the shade area. According to the present embodiment, however, the number of picture elements indicative of colors themselves is processed so that such building shade will not appear in the input picture and luminance contrast will be kept substantially constant, whereby the object monitoring is made reliable. In addition, the arrangement of the present embodiment is effectively used even when the monitoring zone includes scattering areas which are illuminated and not-illuminated.

Figure 46:
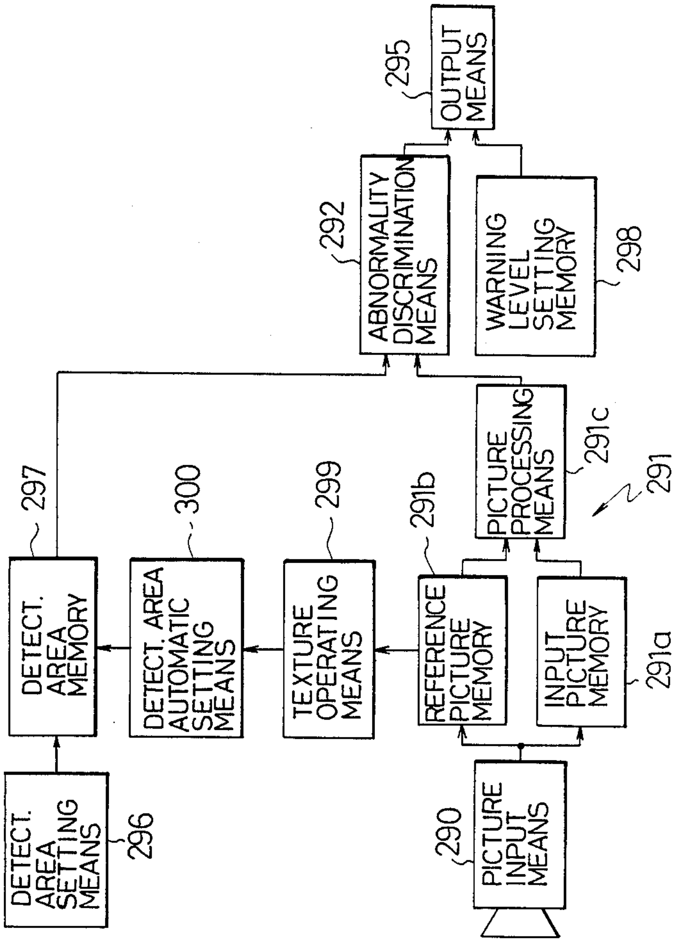
FIG. 46 is a block diagram of another embodiment of the system according to the present invention.

In an embodiment shown in FIG. 46, as seen in comparison with, for example, the embodiment of FIG. 4, a texture operating means 299 and an automatic detection-area setting means 300 are inserted between a reference picture memory 291*b* of a picture processing means 291 and a detection area memory 297. In the illustrated embodiment, the texture operating means 299 is provided with means for receiving an input picture through the reference picture memory 291*b* and calculating the power spectrum of the picture to obtain the texture feature values, and the power spectrum is calculated for each of very small areas within the monitoring zone. The automatic detection-area setting means 300 preliminarily registers therein, as the texture feature values, such power spectrum patterns as a fence, concrete wall, trees, ground surface, sky and the like so that, when the monitoring zone is as shown in, for example, FIG. 47, the automatic detection-area setting means 300 compares the power spectrum patterns from the texture operating means 299 with the registered reference patterns to discriminate correspondence of the very small area of the calculated power spectrum to such particular objects as the fence, trees and the like, and automatically provides the data of the warning levels to the detection area memory 297.

Figure 48:
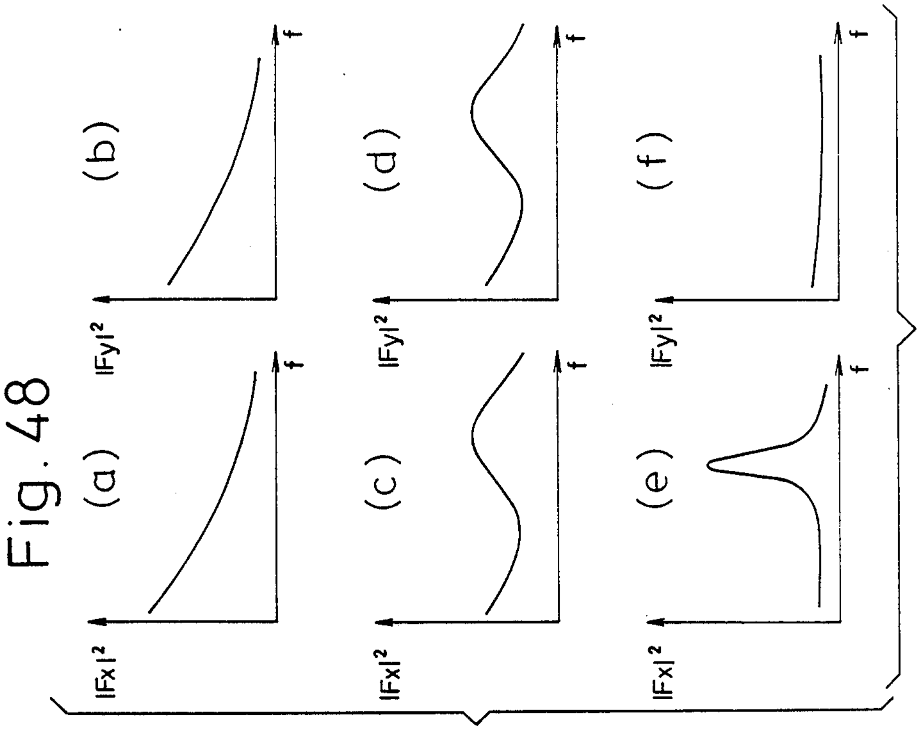
FIGS. 48 (*a*) to (*f*) are diagrams for explaining the operation of a texture operating means in the system of FIG. 46.
Figure 47:
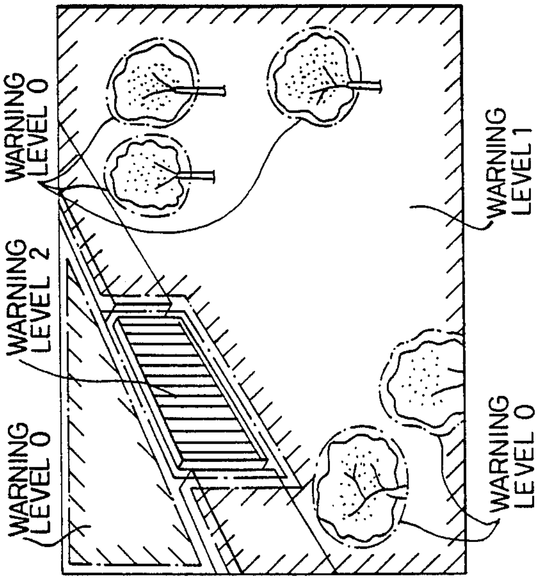
FIG. 47 shows an example of a reference picture for comparison with an input picture in the system of FIG. 46.

The operation of the present embodiment will be explained with reference to FIG. 48, in which diagrams (a), (c) and (e) are showing horizontal or X-directional power spectra and diagrams (b), (d) and (f) are showing vertical or Y-directional power spectra, where the horizontal and vertical axes represent frequency f and the power $|FX|^2$ or $|FY|^2$ of the frequency components. The diagrams (a) and (b), (c) and (d), and (e) and (f) show the power spectra of the very small areas of such an object having a small luminance variation as the concrete wall or the ground, of such an object involving the shake as the tree, and of such an object having many vertically extending members as the fence, respectively. On the basis of these data, the supervising ability for the monitoring zone of FIG. 47 can be enhanced in such that, for example, the small area judgeable to be the tree in view of the data of the diagrams (c) and (d) of FIG. 48 is preliminarily set to have a low or zero warning level, the small area judgeable to be the concrete wall or ground in view of the data of the diagrams (a) and (b) of FIG. 48 is set to have a warning level 1, and further the small area judgeable to be the fence because of such power which is high only in the vertical direction as in the diagrams (e) and (f) of FIG. 48 and appearing to be easy to intrude therethrough is set to have a warning level 2, as indicated in FIG. 47.

Other arrangement and operation of the present embodiment of FIG. 46 are substantially the same as those of the embodiment of FIG. 4, except that the information is provided to the detection area memory 297 in the above-mentioned manner. In FIG. 46, constituent members corresponding to those in the embodiment of FIG. 4 are denoted by the same reference numerals but added by 270.

Figure 49:
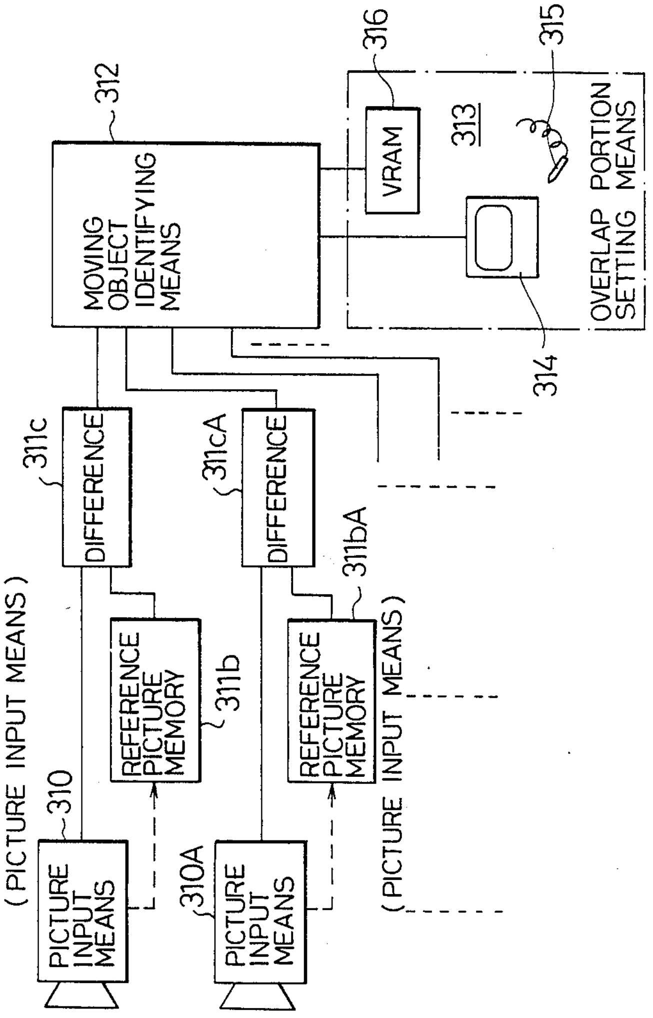
FIG. 49 is a block diagram of another embodiment of the system according to the present invention.

Shown in FIG. 49 is another embodiment of the abnormality supervising system according to the present invention, in which a plurality of picture input means 310, 310A, . . . 310N are operatively associated respectively with each of such picture processing means as that in the foregoing embodiments, and difference circuits 311*c*, 311*c*A, . . . 311*c*N included in the picture processing means calculate the luminance variations between the latest input pictures and the reference pictures of reference picture memories 311*b*, 311*b*A, . . . 311*b*N, results of which calculation are sent to a moving object identifying means 32. This identifying means 312 can process the N input picture signals for an operation of obtaining a wide range moving locus of the object, and also can take either object monitoring or area setting mode. Also operatively coupled to the identifying means 312 is a overlap portion setting means 313 which includes a monitor video 314 and light pen 315 forming a pointing means for specifying set positions on video screen, as well as a picture memory 316 for storing the set positions.

Figure 51:
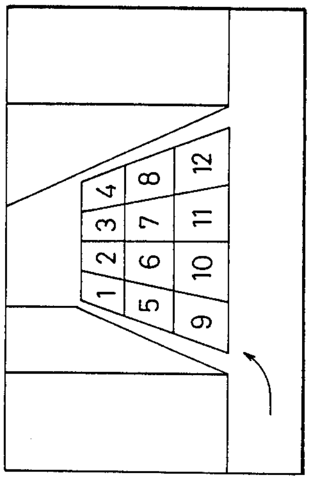
FIGS. 51 and 52 show different examples of monitoring picture in the case of FIG. 49.
Figure 52:
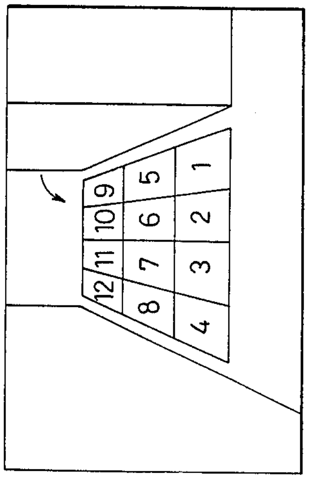
Figure 50:
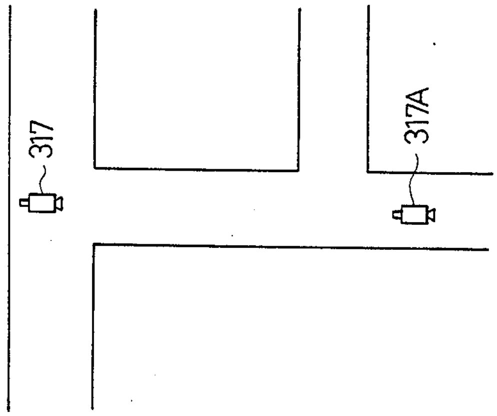
FIG. 50 is a diagram showing an installation of monitoring TV cameras in the system of FIG. 49.

Referring to the operation of the present embodiment with reference to FIGS. 50 to 52, it is assumed here that, upon installation of the present system, TV cameras 317 and 317A forming the picture pickup means of the picture input means 310 and 310A are positioned to monitor a zone of a passage within a building in opposing direction as shown in FIG. 50, so that the camera 317 provides a picture of FIG. 51 and the other camera 317A provides a picture of FIG. 52. Now, the moving object identifying means 312 is placed in the area setting mode, an overlap portion between the monitoring zones of the both cameras 317 and 317A is divided into, for example, such twelve closed areas as shown in FIGS. 51 and 52, preferably, by drawing them on the screen of the monitor video 314 with the light pen 315, the closed areas are stored in the picture memory 316 and also superimposed on the screen of the monitor video 314 for an operator's confirmation. Then the moving object identifying means 312 is placed in the object monitoring mode. If an object moves as shown by an arrow in FIG. 51 or 52 and enters into one of the closed areas designated by 9 in the monitoring mode, the object is located at the same closed area 9 in the overlap portion of the monitoring zones of the two cameras 317 and 317A and thus the identifying means 312 can easily identify that the object is identical to each other.

Therefore, in the present embodiment, a wide range monitoring zone can be set with a plurality of the picture input means 310, 310A, . . . 310N while allowing them to define a common overlapping portion of respective monitoring zones of them, whereby any wide range movement of the object can be enabled to be effectively tracked. In addition, the present embodiment can be effectively utilized as incorporated into the abnormality discrimination means of, for example, FIG. 1.

Figure 53:
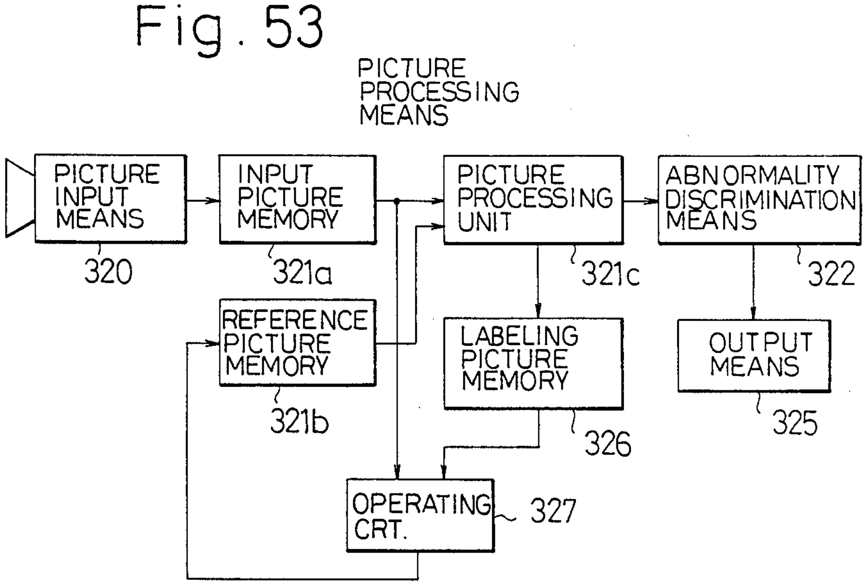
FIG. 53 is a block diagram of another embodiment of the system according to the present invention.

Referring to FIG. 53, there is shown an embodiment in which, as is clear in comparison with the embodiments of FIGS. 1 and 4, a labeled output is provided form a picture processing unit 321*c* which receives outputs of a picture input means 321, to a labeling picture memory 326, and an output of this memory 326 and the picture signal from an input picture memory 321*a* are both provided to an operating circuit 327, an output of which is provided to a reference picture memory 321*b*. A reference picture signal from the reference picture memory 321*b* is sent, as in the foregoing embodiments, to the picture processing unit 321*c* to calculate the luminance variation between the latest input picture signal from the picture input means 320 and the reference picture signal from the memory 321*b*. In the present case, the picture processing unit 321*c* sends, to the labeling picture memory 326, an output at such labeling step immediately before such extracting step as in the picture processing algorithm of FIG. 2. When, on the other hand, the operating circuit 327 receives a binary output of "0" from the labeling picture memory 326, i.e., when there is no luminance variation, the operating circuit 327 provides the input picture signal as it is to the reference picture memory 321*b*, whereas, upon receipt of a binary output of "1" from the memory 326, i.e., when there is a luminance variation, the circuit 327 stops the transfer of that portion in the input picture signal of the luminance variation, and an area of this variation is masked.

Figure 54:
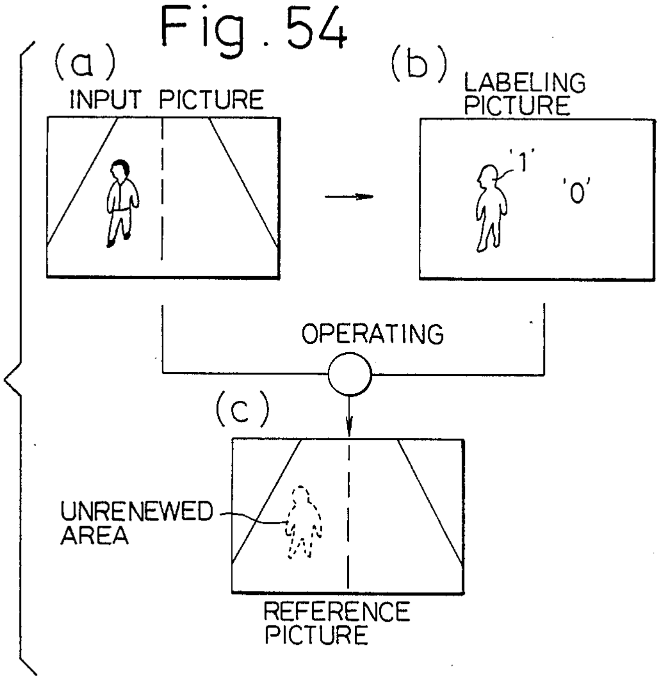
FIG. 54 is a diagram for explanation of renewing operation of a reference picture in the system of FIG. 54.

Referring to FIG. 54, when such an input picture including an object as in FIG. 54*a* is present, an area of the object is labeled with "1" and the other area is labeled with "0" in the labeling step as shown in FIG. 54*b*, in the picture processing unit 321*c*, and the area having the binary value of "1" is masked in the operating circuit 327. As a result, as shown in FIG. 54*c*, a reference picture that has an unrenewed area corresponding to the object and enclosed by a dotted line within other renewed area is sent from the reference picture memory 321*b* to the picture processing unit 321*c*. In this way, the present embodiment can improve the reliability of the reference picture. Other arrangement and operation of the embodiment of FIG. 53 are substantially the same as those of the foregoing embodiments.

Figure 55:
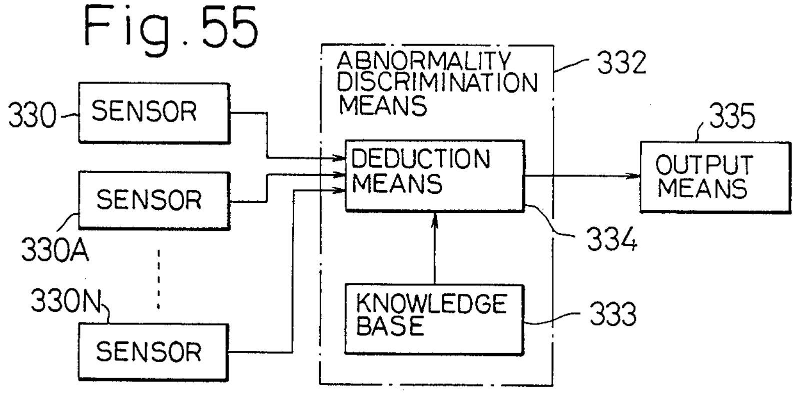
FIGS. 55 to 58 are schematic block diagrams of other different embodiments of the system according to the present invention.

Shown in FIG. 55 is another embodiment, wherein outputs of a plurality of sensors 330, 330A, . . . 330N are provided to an abnormality discrimination means 332 which includes a deduction means 334 for discriminating the absence or presence of an abnormality on the basis of information from a knowledge base 333. These sensors are properly arranged in a monitoring zone to suitably combine information detected by the sensors on the basis of the information from the knowledge base 333 for abnormality discrimination. In the case where first, second and third groups of the sensors are installed, for example, in the vicinity of a concrete wall, an outer house wall and a house entrance of a residential ground, respectively, and it may be possible to discriminate a presence of an intruder when there is a continuous detection of outputs from the first to third sensor groups in the nighttime.

Figure 56:
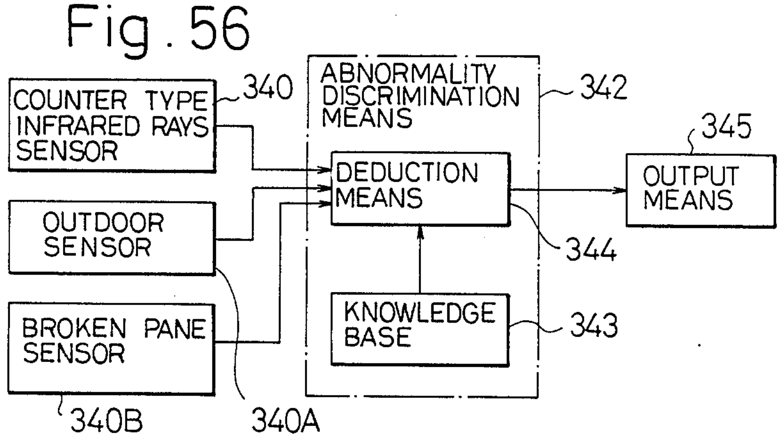

A relatively simpler example of the embodiment of FIG. 55 is shown in FIG. 56, which uses a first infrared-ray sensor 340 of two opposing elements installed on both sides of an entrance gate of a residential ground, a second reflection-type ultrasonic, electric-field detection or the like type sensor 340A installed in the vicinity of a house window, and a third pane-break sensor 340B installed on a pane of the same window. With these sensors, the abnormality information can be sequentially sent from such sensors to an abnormality discrimination means 342 and, if necessary, the discriminated abnormality can be stepwise informed by an output means 345.

The embodiments of FIGS. 55 and 56 can be incorporated in the arrangements of the foregoing embodiments to contribute to the expansion of the expert system as well as to the improvement in the reliability.

Figure 57:
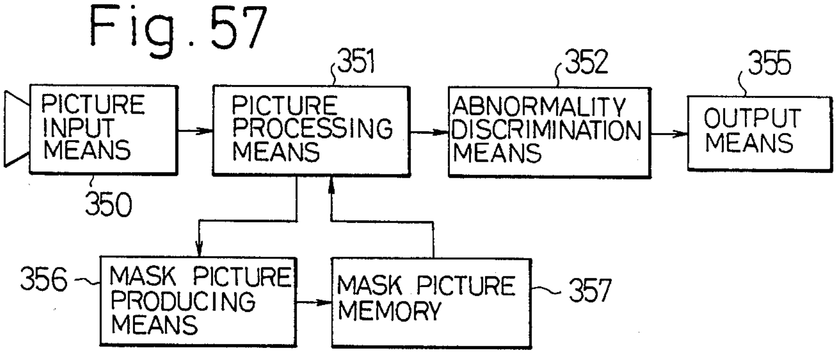

In another embodiment shown in FIG. 57, as is clear in comparison with the embodiment of FIG. 1, an output of a picture processing means 351 is provided to a mask picture producing means 356 an output of which is provided to a mask picture memory 357 to be stored therein for use in one of the steps in the picture processing algorithm of the picture processing means 351. When, for example, a tree located within the monitoring zone is shaken to cause a luminance variation to be likely to cause an erroneous operation of the system, the mask picture producing means 356 masks the tree in the input picture. Since this enables it possible to ignore any luminance variation at an area likely to cause the erroneous operation and thus to follow the picture processing algorithm, a highly reliable supervision can be effected.

Figure 58:
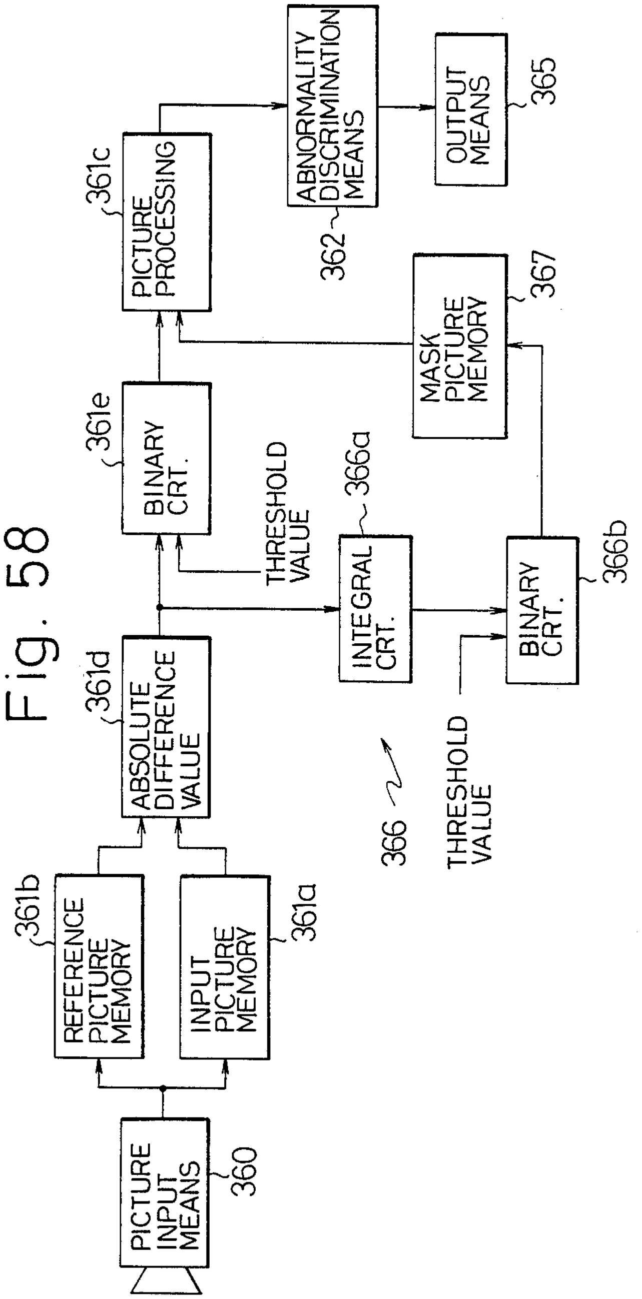
Figure 59:
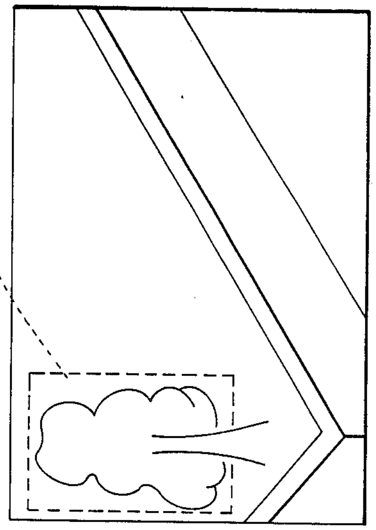
FIG. 59 is a diagram for explanation of the operation of the system of FIG. 58.

A practical example of the embodiment of FIG. 57 is shown in FIG. 58, in which a picture processing means 361*c* practically may have the same arrangement as, for example, the picture processing means in the embodiment of FIG. 27, and the same constituents as those in FIG. 27 are denoted by the same reference numerals but added by 180. In the present instance, a mask picture producing means 366 comprises an integral circuit 366*a* receiving an output of an absolute difference value circuit 361*d* of the picture processing means, and a binary circuit **366*b* receiving an output of the integral circuit and a predetermined threshold value, and this integral circuit 366*a* functions to add a predetermined number of input pictures, so that the integral circuit 366*a* provides data including a relatively larger integration value for an area where the luminance variation occurs frequently in the picture of the monitoring zone, as well as a relatively smaller integration value for other area in the picture. Such data are converted at the binary circuit 366*b* with a threshold value into a binary mask picture in which a binary value of "1" is given to the area of the frequent luminance variation and a binary value of "0" is given to the other area. The mask picture is sent from a mask picture memory 367 again to the picture processing unit 361*c* of the picture processing means so that, when such an input picture of the monitoring zone as shown in FIG. 59** is being obtained, an area including a tree in the monitoring zone as enclosed by a dotted line is treated as a masked area MSK any luminance variation occurring in which is to be ignored in performing the abnormality discrimination. Other arrangement and operation of the present embodiment are substantially the same as those of the foregoing embodiments.

Figure 60:
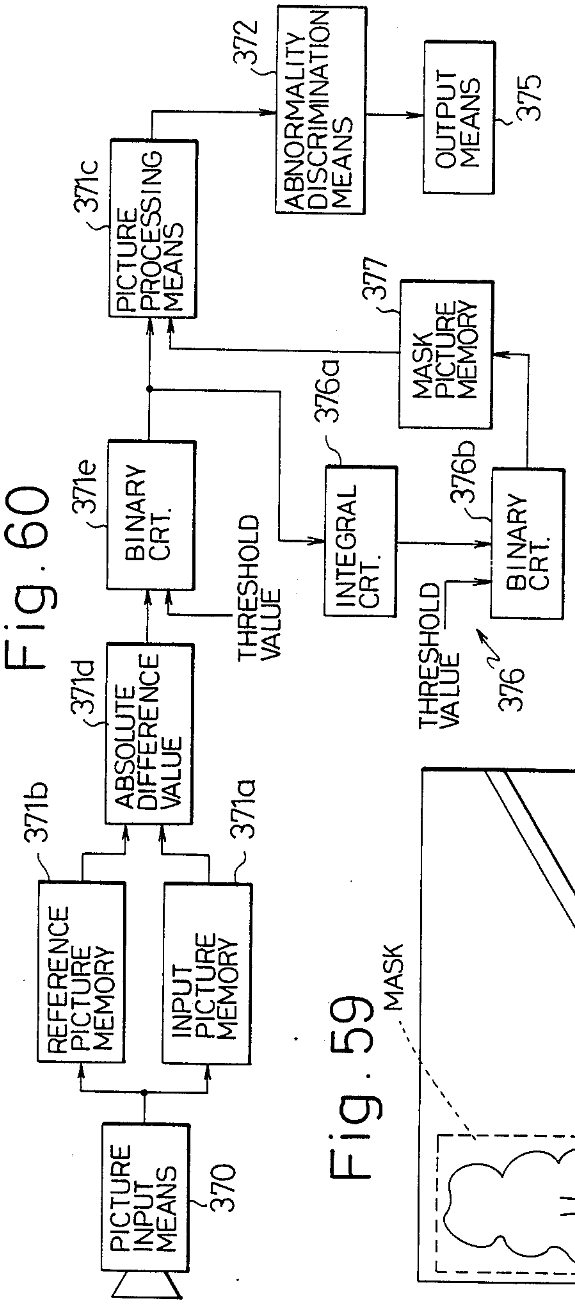
FIGS. 60 to 63 are block diagrams of further different embodiments of the system according to the present invention.

In the example of FIG. 58, the input to the integral circuit **366*a* of the mask picture producing circuit 366 is obtained from the absolute difference value circuit 361*d* of the picture processing means. However, as seen in FIG. 60, the same operation as in FIG. 58 is attainable even when an input to a mask picture producing means 376 is obtained from a binary circuit 371*e* at a subsequent stage of an absolute difference value circuit 371*d*** in a picture processing means.

Figure 61:
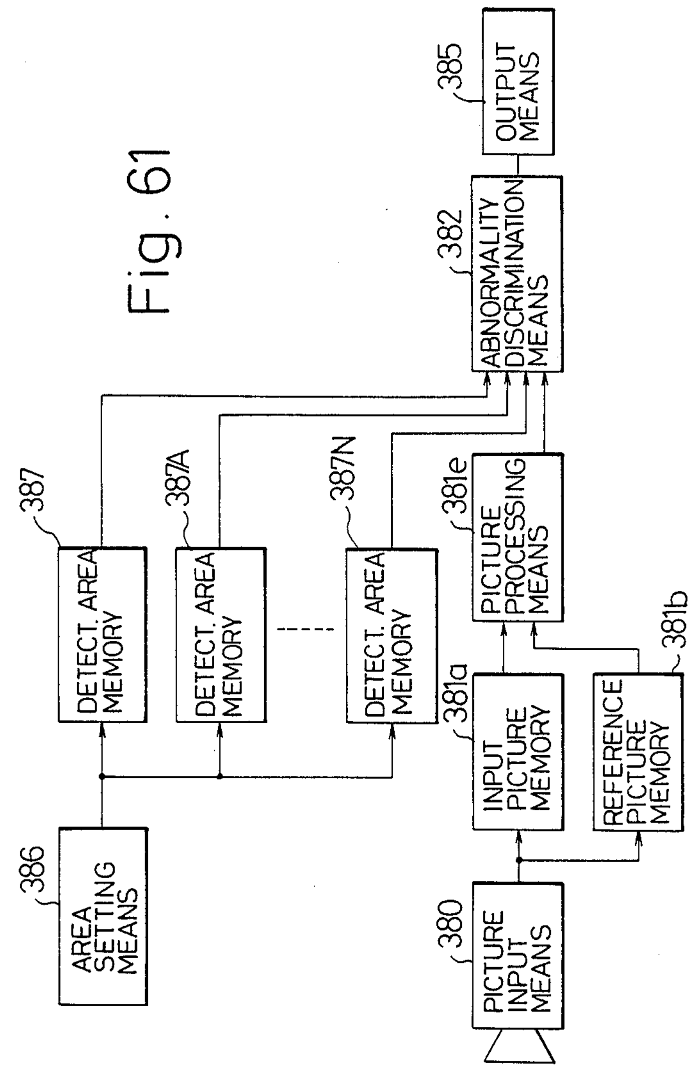

Shown in FIG. 61 is another embodiment in which, as is clear in comparison with the embodiment of FIG. 4, a plurality of detection area memories 387, 387A, . . . 387N are arranged between an area setting means 386 and an abnormality discrimination means 382. In the present embodiment, different detecting sections of such a relatively broader monitoring zone as a factory site are stored as detection objects and the abnormality discrimination is executed in different modes for the respective detecting sections. In this case, the areas to be stored in the detection area memories should be such sections in the site as a place in the vicinity of an entrance door of the factory site, a place where such fire-involving equipment as welding machine or the like is used, areas in which industrial robots, operatorless carrier vehicles or the like are in operation, and so on. According to the present embodiment, therefore, the monitoring of such different sections in the zone can be achieved by commonly using a picture input means 380, picture processing means **381*a*, 381*b* and 381*c*, the major part of the abnormality discrimination means 382 and an output means 385, and such different sorts of monitoring as intruder monitoring, fire preventive monitoring, production line monitoring and so on can be realized with use of a single abnormality monitoring unit. Other arrangement and operation of the embodiment of FIG. 61** are substantially the same as those of the foregoing embodiments.

Figure 62:
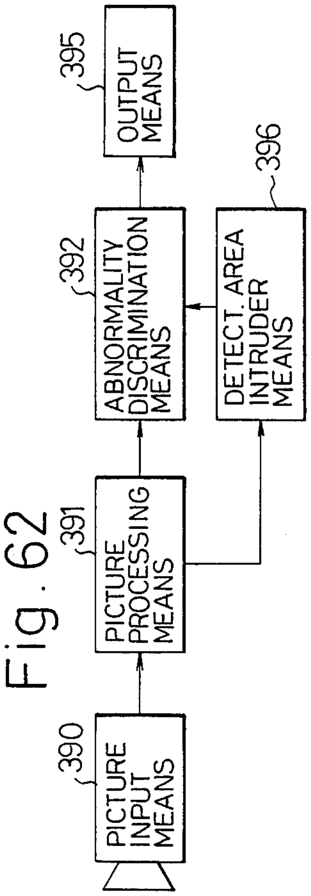

Referring to FIG. 62, there is shown another embodiment, in which, as is seen in comparison with the embodiment of FIG. 1, a detection area transfer means 396 is provided for receiving an output of a picture processing means 391 to transfer the detection area in response to a displacement of the object and to provide an output to an abnormality discrimination means 392, so as to concentrate the monitoring function on the moving object.

Figure 63:
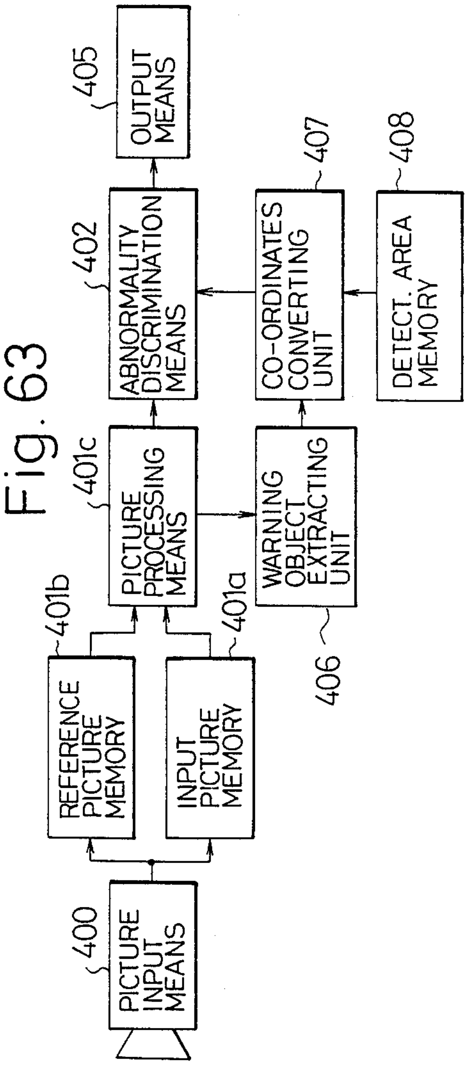
Figure 64:
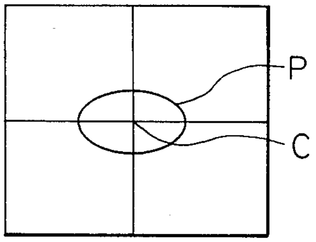
FIGS. 64 to 66 are diagrams for explanation of the operation of the system of FIG. 63.
Figure 65:
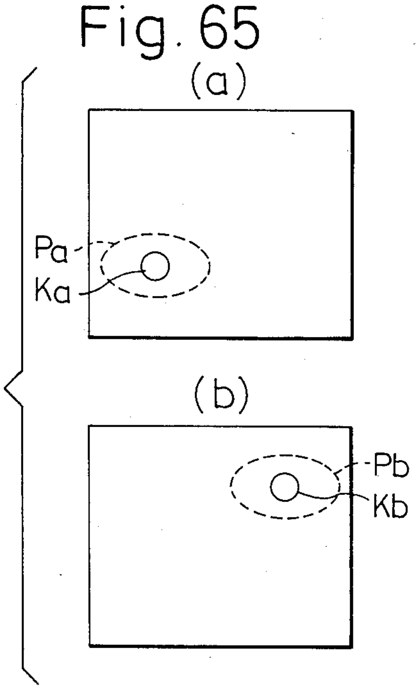

Shown in FIG. 63 is a more practical example of the embodiment of FIG. 62, in which a detection area transfer means comprises an object extracting unit 406 receiving an output of a picture processing means 401, a coordinate converting unit 407 receiving an output of the extracting unit 406 and a memory 408 providing the data of the detection object area to the coordinate converting unit 407. In the object extracting unit 406, such picture processing as shown in FIG. 2 is carried out in the picture processing means 401 in such that the most similar object is extracted by means of the pattern matching operation or the like from the feature values of the object obtained at the feature-value operating step, and the center coordinates of the extracted object are calculated. The coordinate converting unit 407 shifts a detection area P enclosing the center C of the object as shown in FIG. 64 and stored in the detection area memory 408, so as to follow the movement of the object on the basis of the center coordinates of the object obtained at the object extracting unit 406. That is, when the object located at a position Ka on the lower left side of the picture as shown in FIG. **65*a* moves to a position Kb on the upper right side of the picture as shown in FIG. 65*b*, the coordinate converting unit 407** shifts the respective detection areas from Pa to Pb, following the movement of the object.

Figure 66:
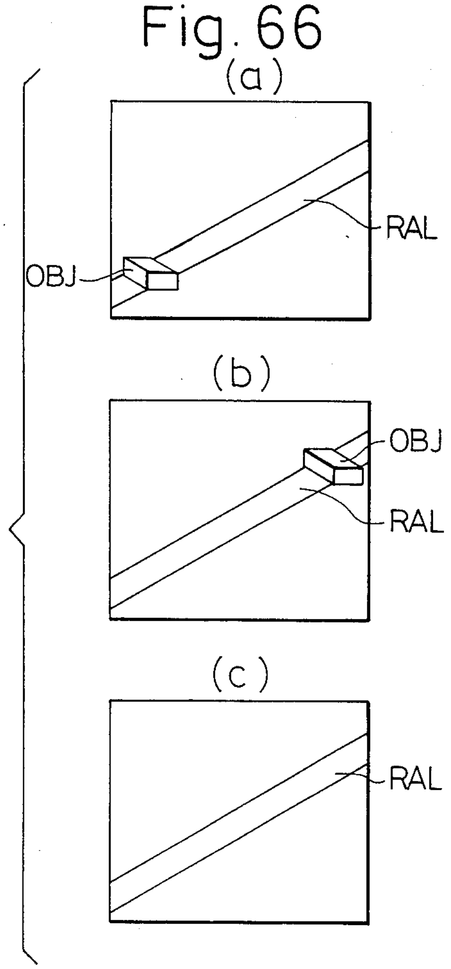

Provided that the object is present always in the input picture, or in other words, where the monitoring zone is set to include an area in which the object is moving, then such a picture in which the object is absent will be required as the reference picture for the picture processing means. In this event, such reference picture may be obtained in such that, when, for example, such an object OBJ as an operatorless vehicle reciprocating along a rail RAL is located at the lower left side of an input picture as shown in FIG. **66*a* and the object OBJ is located at the upper right side in another input picture as shown in FIG. 66*b*, these input pictures are composed into a picture of FIG. 66*c***.

Figure 67:
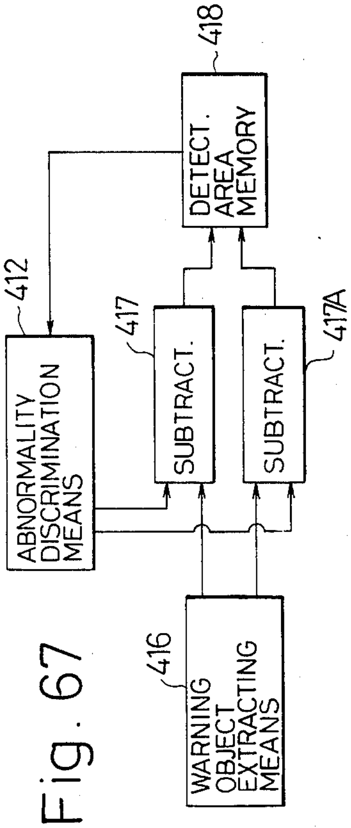
FIG. 67 is a block diagram of a coordinate conversion section in the system of FIG. 63.

A more practical example of the embodiment of FIG. 62 may be of such an arrangement as shown in FIG. 67. In the present instance, as seen in comparison with the embodiment of FIG. 63, a coordinate converting unit comprises subtraction circuits 417 and 417A connected in parallel to an abnormality discrimination means 412, an object extracting unit 416 and a detection area memory 418. Center coordinates $X_1$ and $Y_1$ of an object are sent from the object extracting unit 416 to the both subtraction circuits 417 and 417A, while coordinates $X_2$ and $Y_2$ of a luminance variation are sent from the abnormality discrimination means 412 also to the subtraction circuits 417 and 417A for operations therein of $X_3=X_2-X_1$ and $Y_3=Y_2-Y_1$, and thereby address coordinates $X_3$ and $Y_3$ are provided to the detection area memory 418 for its accessing, so that the detection area is transferred following the movement of the object.

Figure 68:
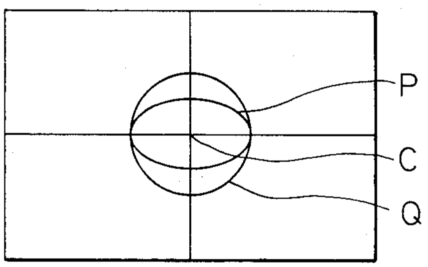
FIG. 68 is a diagram for explaining another form of the operation of the system of FIG. 63.

In the foregoing detection area transferring means, it is preferable to set, as shown in FIG. 68 and in addition to the detection area P, a tracking area Q made to be of the maximum moving range of the object, for example, during one sampling time, with respect to the object having a center C. This enables the concentrated monitoring only for the tracking area Q and speeds up the abnormality discrimination. Other arrangement and operation of the embodiments of FIGS. 62 to 68 are substantially the same as those of the foregoing embodiments.

Figure 69:
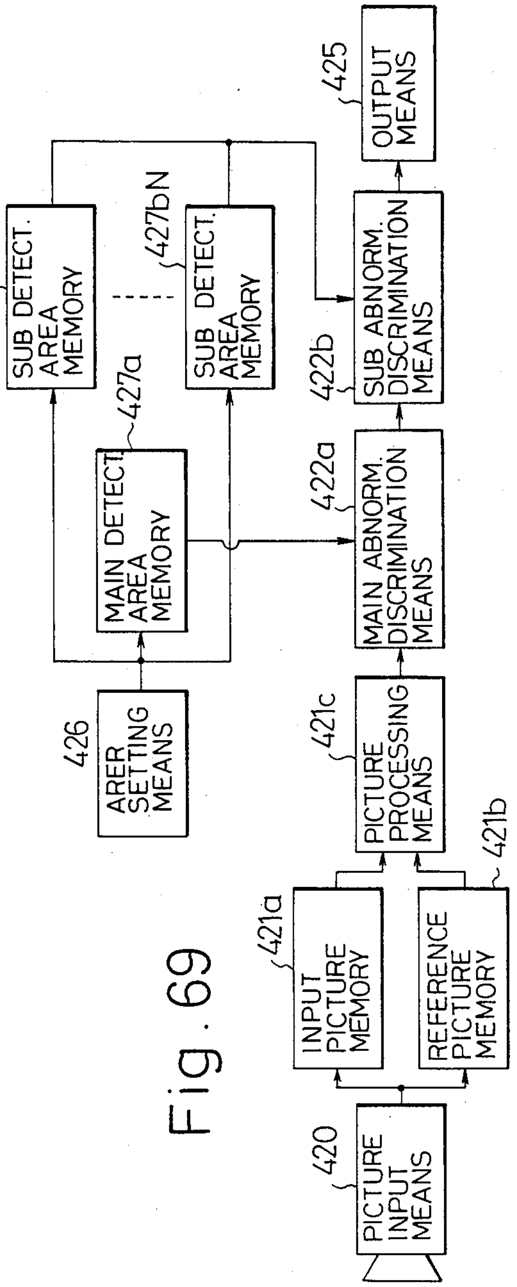
FIGS. 69 and 70 are block diagrams of other different embodiments of the system according to the present invention.

In an embodiment shown in FIG. 69, as is clear in comparison with the embodiment of FIG. 4, the discrimination means comprises a main abnormality discrimination means 422*a* and a sub-abnormality discrimination means 422*b*, and the detection area memory comprises a main detection memory 427*a* and a plurality of sub-detection area memories 427*b*, . . . 427*b*N. An output of the main detection memory 427*a* is provided to the main abnormality discrimination means 422*a*, and outputs of the sub-detection memories 427*b*, . . . *427b*N are provided to the sub-abnormality discrimination means 422*b*. In this case, the main detection area memory 427*a* stores set areas of a monitoring zone for a relatively rough discrimination, while the sub-detection area memories 427*b*, . . . 427*b*N store set areas of the monitoring zone for a relatively minute discrimination. In the present embodiment, the rough discrimination is first made and, if an abnormality is detected by this rough discrimination, then the minute discrimination is further made, whereby the informing operation of the supervising system is made more highly reliable. Other arrangement and operation of the present embodiment are substantially the same as those of the foregoing embodiments.

Figure 70:
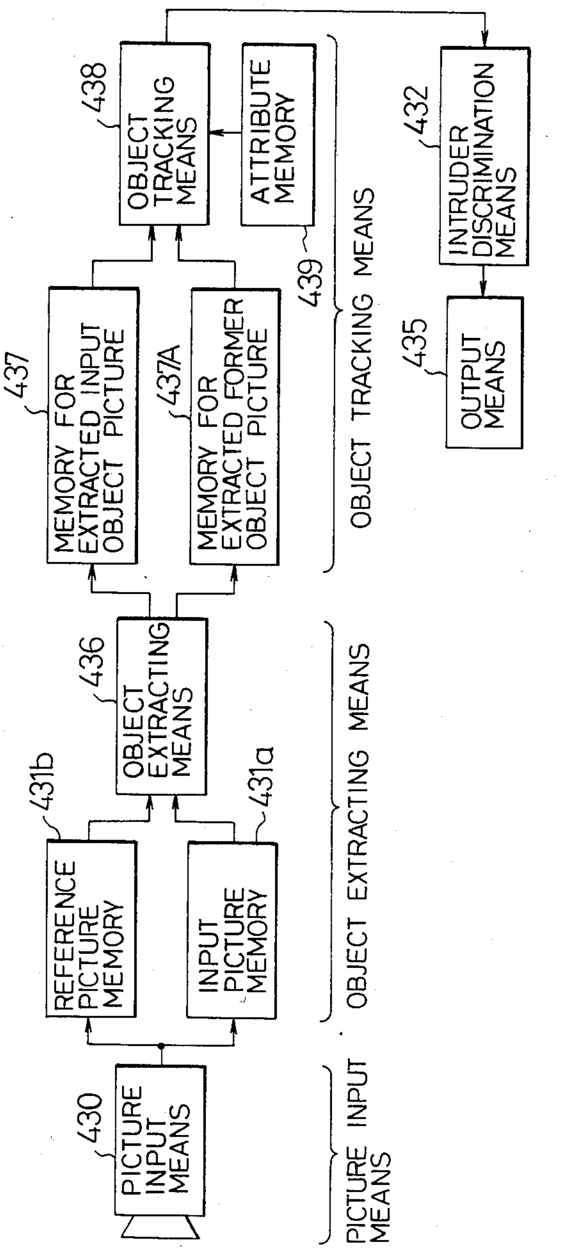

Referring to FIG. 70, there is shown another embodiment in which, as seen in comparison with the embodiment of FIG. 1, the picture processing means provided between a picture input means 430 and an abnormality, in particular, intruder discrimination means 432 includes an object extracting means and an object tracking means. In the illustrated embodiment, the object extracting means includes an input picture memory 431*a* and a reference picture memory 431*b* both receiving an output of the picture input means 430, as well as an object extracting unit 436 receiving outputs of the both memories, while the object tracking means includes an extracted input object picture memory 437, a extracted former object picture memory 437A and an object tracking means 438 receiving outputs of the both memories and, if necessary, an output of an attribute memory 439.

Figure 71:
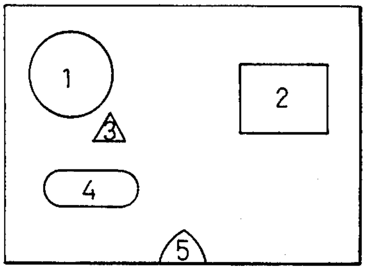
FIGS. 71 to 75 are diagrams for explanation of the operation of the system of FIG. 70.
Figure 72:
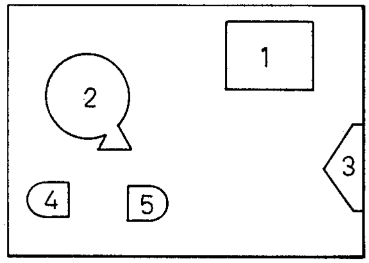

In the object extracting means 436, the same picture processing as that of the picture processing means 21*c* in the embodiment of, for example, FIG. 4 is performed, i.e., an input picture is subjected to the binary conversion and labeling. The labeled binary picture is sent to the extracting memories 437 and 437A. In an event where the input picture sent from the extracting means 436 is as shown in FIG. 71 and stored in the extracted input object picture memory 437, while such a picture as shown in FIG. 72 is previously stored in the extracted former object picture memory 437A upon receipt of previous input picture, objects designated by FIGS. 1 to 5 are known to have been moved, and a tracking of the objects is to be effected for identification of them in the object tracking unit 438.

Figure 73:
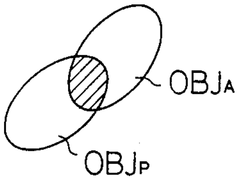
Figure 74:
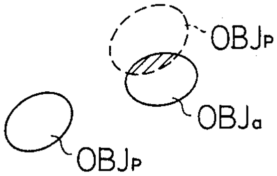
Figure 75:
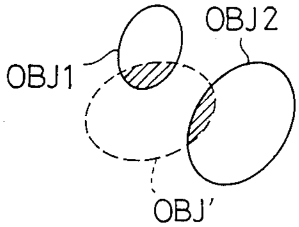

More in details, the identifying operation at the object tracking unit 438 is carried out in such that, if an object $OBJ_A$ in the latest input picture and an object $OBJ_P$ in the previous picture partly overlap to form an overlapping portion shown as hatched in FIG. 73, these objects are judged to be an identical object. On the other hand, when the sampling speed of the picture of the system is lower than the moving speed of the object and there is no overlapping portion between the objects in the input and previous pictures, the system predicts a position of the object upon extraction of the latest input picture on the basis of a displacement vector of the object $OBJ_P$ upon extraction of the previous picture to obtain such a predictive object $OBJ_P'$ as shown in FIG. 74 and judges an object having such a hatched portion overlapping with the predictive object $OBJ_P'$ on the input picture to be identical. When a predictive object is obtained as overlapping with both objects OBJ1 and OBJ2 on the input and previous pictures as shown in FIG. 75 and thus it is impossible to identify the objects, the object identifying operation can be achieved by finding such shape parameters of the both objects as their sizes, major axis ratio, etc., and discriminating them on the basis of the similarity.

Further, in an event where information of a tree or the like located in the monitoring zone to allow an object to be hidden behind it is previously stored in the attribute memory 439 operatively associated with the object tracking unit 438, the identity discrimination of such object the luminance variation due to which is caused to temporarily disappear when coming behind the tree can be still performed when the luminance variation again takes place in the vicinity of the tree.

In this way, according to the embodiment of FIG. 70, a continuous object tracking can be executed and an accurate abnormality discrimination can be realized. Other arrangement and operation of the present embodiment are substantially the same as those of the foregoing embodiments.

Figure 77:
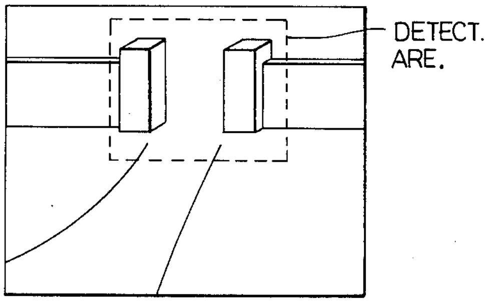
FIG. 77 is a diagram for explanation of the operation of the system of FIG. 76.
Figure 76:
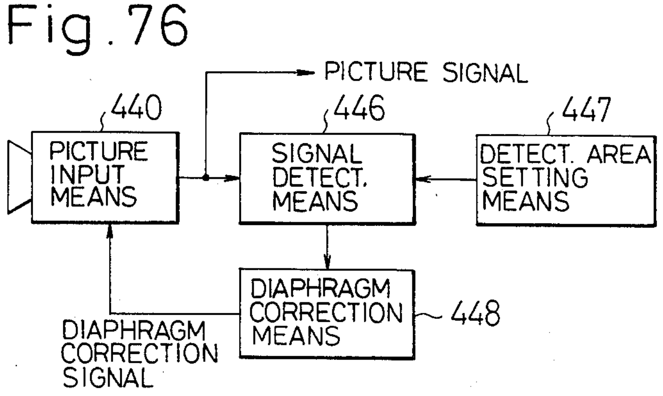
FIG. 76 is a block diagram of another embodiment of the system according to the present invention.

FIG. 76 shows a means for automatically correcting the diaphragm of the TV camera included in the picture input means in the foregoing embodiments. The automatic diaphragm correcting means includes a signal detecting means 446 which receives an output of a picture input means 440 and an output of a detection area setting means 447, an output of the signal detecting means 446 being provided to a diaphragm correcting means 448 which in turn provides a diaphragm correction signal as its output to the picture input means 440. Now, when the picture input means 440 provides such a picture as shown in FIG. 77, such a detection area as enclosed by a dotted line in the picture is set by the detection area setting means 447, and the picture is processed by the signal detecting means 446 and diaphragm correcting means 448 without being subjected to the luminance variation of other area in the picture than the detection area, and is then subjected to the picture processing at the subsequent stage.

Figure 78:
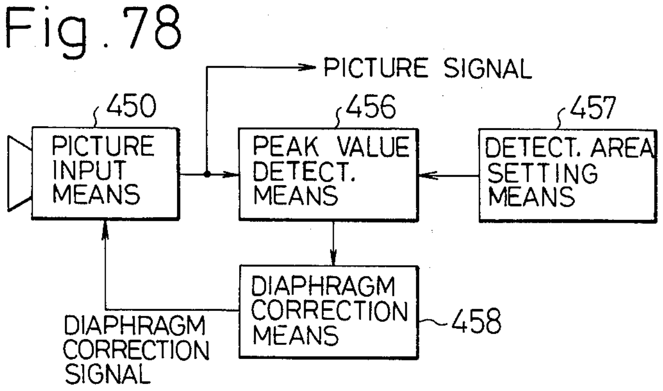
FIGS. 78 and 79 are block diagrams at their major part of other different embodiments of the system according to the present invention.
Figure 79:
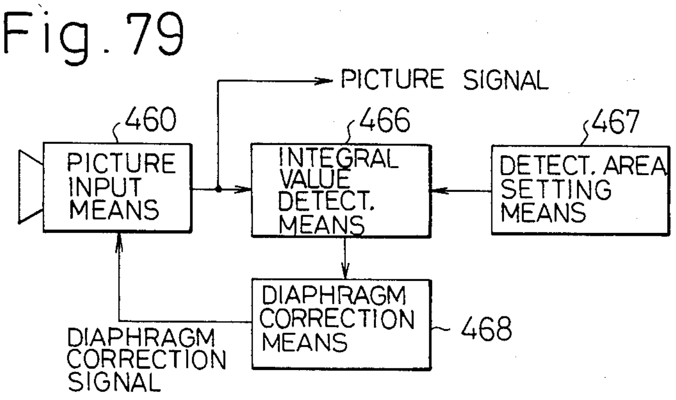

As the signal detecting means in the embodiment of FIG. 76, optimumly, a peak value detecting means 456 is employed as shown in FIG. 78, in which the means 456 is provided with a peak-value hold circuit which receives the peak value, i.e., the maximum luminance level of a picture signal received through, for example, an analog switch, and a diaphragm correction signal is generated through a diaphragm correcting means 458 according to the maximum luminance level, and to send it to a picture input means 450. The signal detecting means in FIG. 76 may also comprise, as shown in FIG. 79, an integral value detecting means 466 which integrates the luminance level of input pictures to obtain an average luminance level, to generate the diaphragm correction signal through a diaphragm correcting means 468 and to send it to a picture input means 460.

Further, it will be appreciated that the area setting at the detection area setting means 447, 457 and 467 can be carried out by means of a graphic tablet or the like. The output of each of the picture input means 440, 450 and 460 subjected to the diaphragm correction is used for the picture processing, abnormality discrimination and informing operation, as already explained in connection with the foregoing embodiments.

Figure 80:
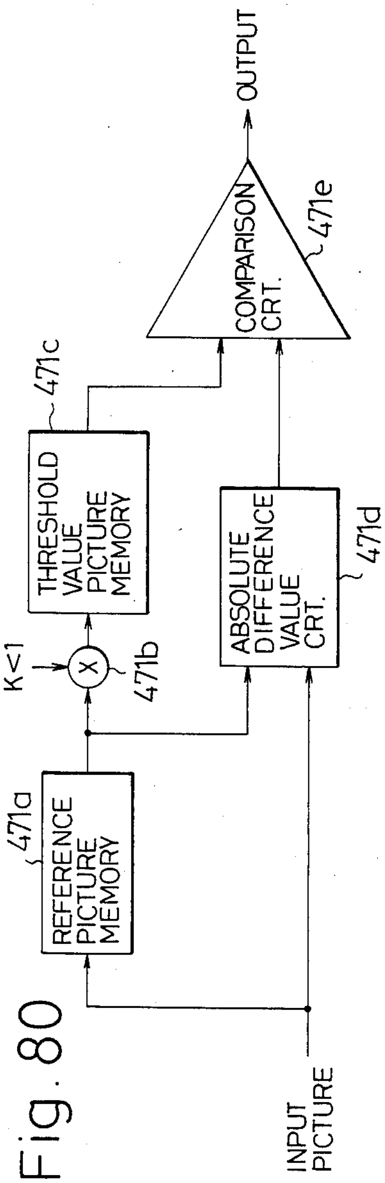
FIG. 80 is a block diagram of a major part of another embodiment of the system according to the present invention.

In another embodiment shown in FIG. 80, the picture input means is formed so that an output of a reference picture memory 471*a* is provided to an absolute difference value circuit 471*d* together with an input picture signal, and also through a multiplier 471*b* for multiplication of a constant K smaller than 1 to a threshold value picture memory 471*c* which uses as a threshold value the output of the multiplier 471*b*. Outputs of the threshold value picture memory 471*c* and absolute difference value circuit 471*d* are both sent to a comparison circuit 471*e* to convert the input and reference picture signals into binary picture signals for the picture processing at the subsequent stage.

Figure 81:
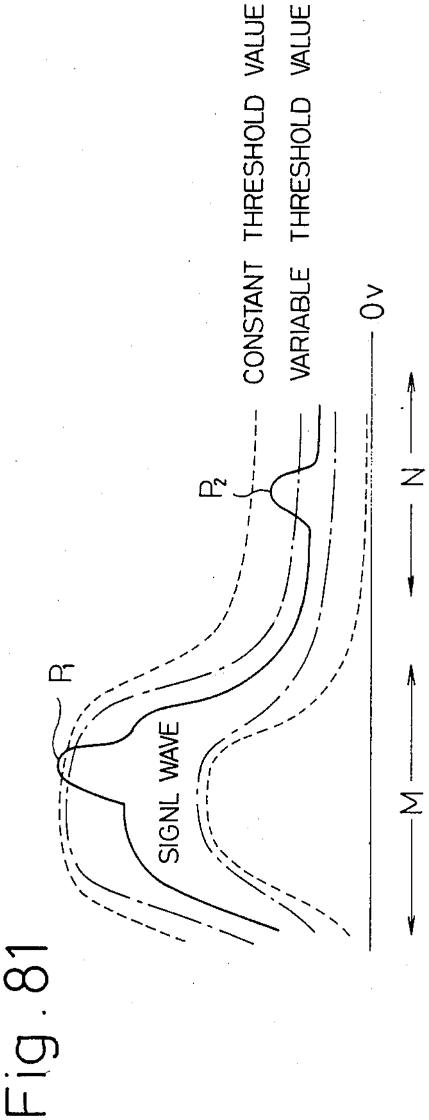
FIG. 81 is a diagram for explaining the operation of the system of FIG. 80.

The operation of the present embodiment will be explained with reference to FIG. 81. In the drawing, a solid-line signal waveform corresponds to one horizontal line in the input picture, M and N are ranges corresponding to parts of the horizontal line having high and low luminance, respectively, and relatively high and low peak values P1 and P2 of the signal indicate objects in the high and low luminance ranges. When the threshold value provided to the comparison circuit 471*e* is constant, as shown by dotted line curves in the drawing, the signal waveform becomes constant in its vertical width regardless of the magnitude of the luminance, i.e., brightness and darkness of the picture, so that there is a risk that even an object present in the range N does not cause the signal to reach the threshold level and thus no abnormality can be discriminated. According to the present embodiment, on the other hand, a reference picture without any abnormality is multiplied by the constant K smaller than 1, for example, 0.3, to provide a variable threshold value, and this value is sent through the threshold value picture memory 471*e* to the comparison circuit 471*e*, so that, as shown by chain-line curves in FIG. 81, the threshold curve varies largely in its vertical width in the range M but slightly in the range N depending on the brightness and darkness of the picture. Therefore, the object can be positively grasped and the system can be remarkably improved in the reliability.

Figure 82:
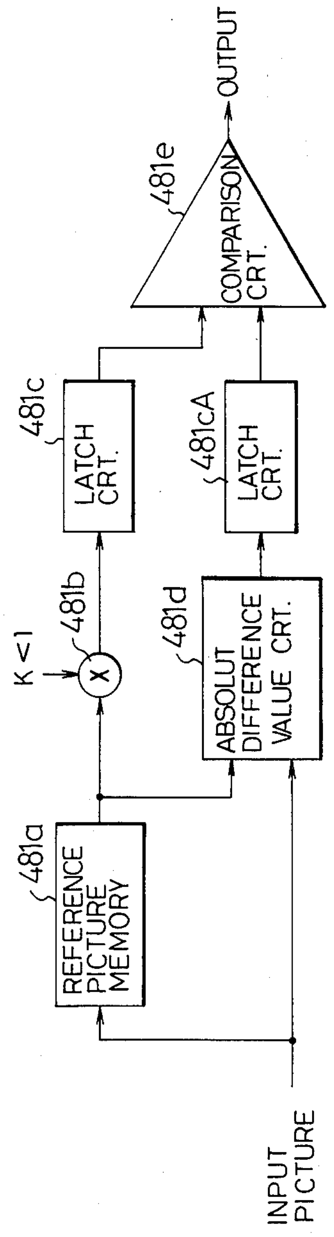
FIG. 82 is a block diagram at a major part of another embodiment of the system according to the present invention.

Further, as shown in FIG. 82, the threshold value picture memory in FIG. 80 may be replaced by a latch circuit 481*c* which is connected in parallel with another latch circuit 481*c*A provided between an absolute difference value circuit 481*d* and a comparison circuit 481*e*, to provide a variable threshold value and a luminance variation signal simultaneously to the comparison circuit 481*e* through the both latch circuits 481*c* and 481*c*A, whereby the same operation as in the embodiment of FIG. 80 can be attained. In the embodiments of FIGS. 80 to 82, the picture input means, other part of the picture processing means, abnormality discrimination means and output means have substantially the same arrangements as those in the foregoing embodiments.

Figure 83:
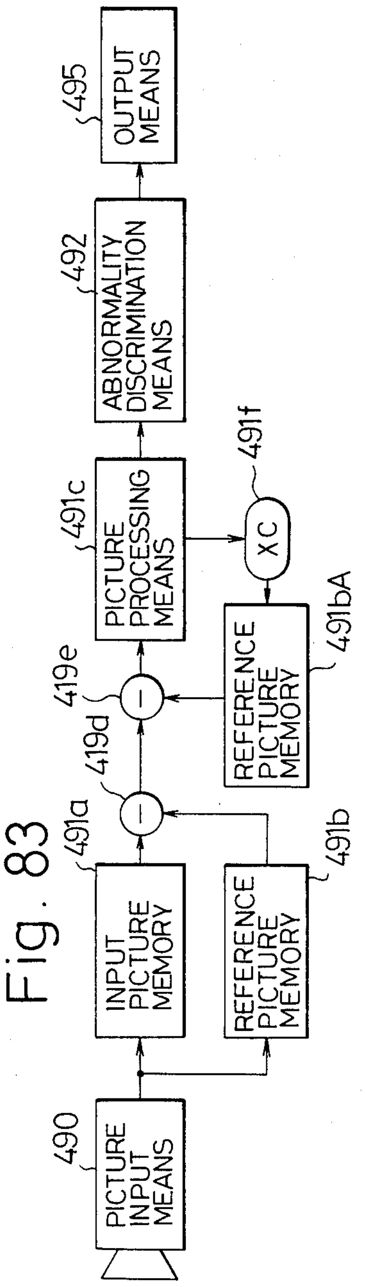
FIG. 83 is a block diagram of another embodiment of the system according to the present invention.

Referring to FIG. 83, there is shown an embodiment in which, as seen in comparison with the embodiment of FIG. 4, a picture processing means provided between a picture input means 490 and an abnormality discrimination means 492 includes a first subtractor 491*d* which receives outputs of an input picture memory 491*a* and a first reference picture memory 491*b* and performs a subtraction over them, to function to remove stable background in the picture of the monitoring zone, an output of the subtractor 491*d* being sent to a second subtractor 491*e* and then to an abnormality processing means 491*c*. The second subtractor 491*e* also receives an output of a second reference picture memory 491*b*A which in turn receives an output of the picture processing means 491*c* through a multiplier 491*f*.

Figure 84:
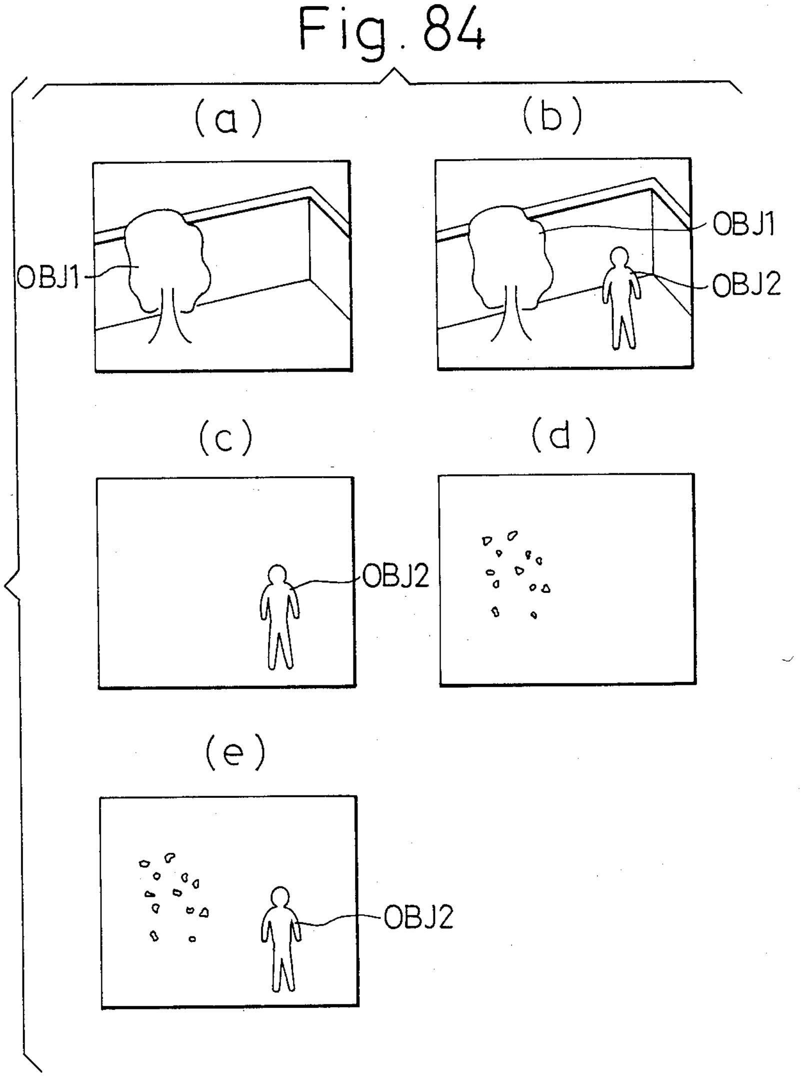
FIG. 84 is a diagram for explaining the operation of the system of FIG. 83.
Figure 85:
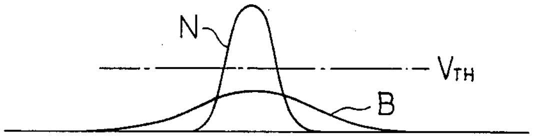
FIG. 85 is a diagram for explaining the operation of a picture processing section in the system of FIG. 83.

The operation of the present embodiment will be explained with reference to FIGS. 84 and 85. When such an input picture including an abnormal object OBJ2 as shown in FIG. 84*b* appears with respect to such a reference picture including normal object OBJ1 as shown in FIG. 84*a*, such a subtraction picture including only the abnormal object OBJ2 as shown in FIG. 84*c* is obtained from the first-stage subtractor 491*d*. In this case, the picture processing part 491*c* at the subsequent stage converts its input to a binary signal according to such a predetermined threshold value $V_{TH}$ as shown in FIG. 85 but, when the output of the subtractor 491*e* contains an impulsive noise N, produces an output B restrained to be lower than the threshold level $V_{TH}$ through a filtering to have the picture vignetted, whereby the transfer of the abnormal picture signal due to such noise N is restrained and the impulsive noise can be eliminated. In this manner, it is made possible to eliminate any minor noise in such case where the background is stable or stationary in the input picture as a monitoring of a room interior.

Apart from such impulsive noise as above, a shake or the like occurring in the normal object OBJ1 in the input picture of, for example, an outdoor monitoring zone may cause an abnormality output to be provided even in the absence of abnormality, due to that the luminance variation takes place at a position corresponding to the object OBJ1 as shown in FIGS. 84*d* and 84*e*. In the present embodiment, the fact that the luminance variation due to the shake of tree or the like object OBJ1 takes place at the same position is taken into consideration, and an input picture immediately before the latest input picture is stored in the second reference picture memory 491*b*A so that any luminance variation due to such shake or the like is subjected to the subtraction at the second subtractor 491*e* to thereby eliminate the minor noise. In storing the "immediately-before" input picture in the second reference memory 491*b*A, it should be avoided that even a picture involving an abnormality in practice is stored as a reference picture by making the "immediately-before" input picture as it is to be the reference picture. For this purpose, the input picture having any luminance variation is multiplied by a constant C smaller than 1, for example, 0.5 at the multiplier 491*f*, and the thus multiplied picture is stored in the second reference picture memory 491*b*A as the reference picture, whereby the luminance variation of the minor noise can be reduced to be half. Since the variation on the input picture is small enough in the area, the variation can be effectively removed at the subsequent stage picture processing means 491*c* for the filtering and binary conversion. Accordingly, the transfer of the abnormality output caused by the shake of the background object can be prevented and the system can be improved in the reliability. Other arrangement and operation of the embodiment of FIG. 83 are substantially the same as those of the foregoing embodiments.

Figure 86:
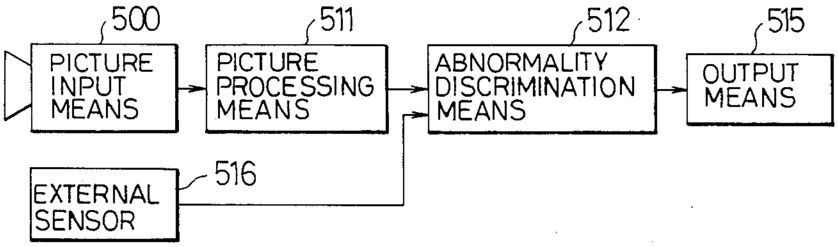
FIG. 86 is a block diagram of another embodiment of the system according to the present invention.

Referring to FIG. 86, there is shown an embodiment in which, as seen in comparison with FIG. 1, a picture processing signal and a detection signal of an external sensor 516 are provided to an abnormality discrimination means 512 to realize an expansion of the expert system. As the external sensor 516, a sensor providing a distance to an object, a temperature sensor or any other sort of sensor may be utilized.

Figure 87:
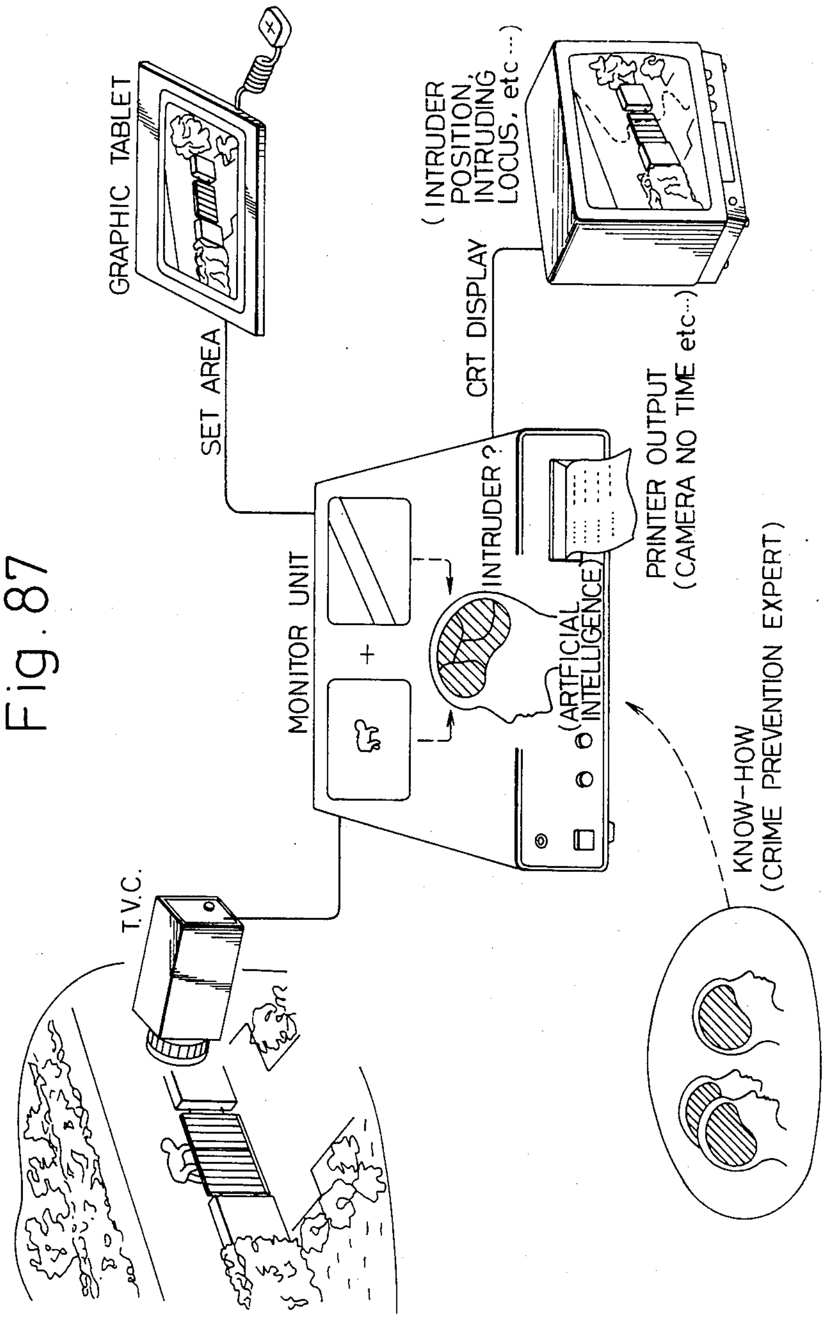
FIG. 87 shows a practical explanatory diagram for showing a case where the present invention is applied to a intruder supervising system.
Figure 88:
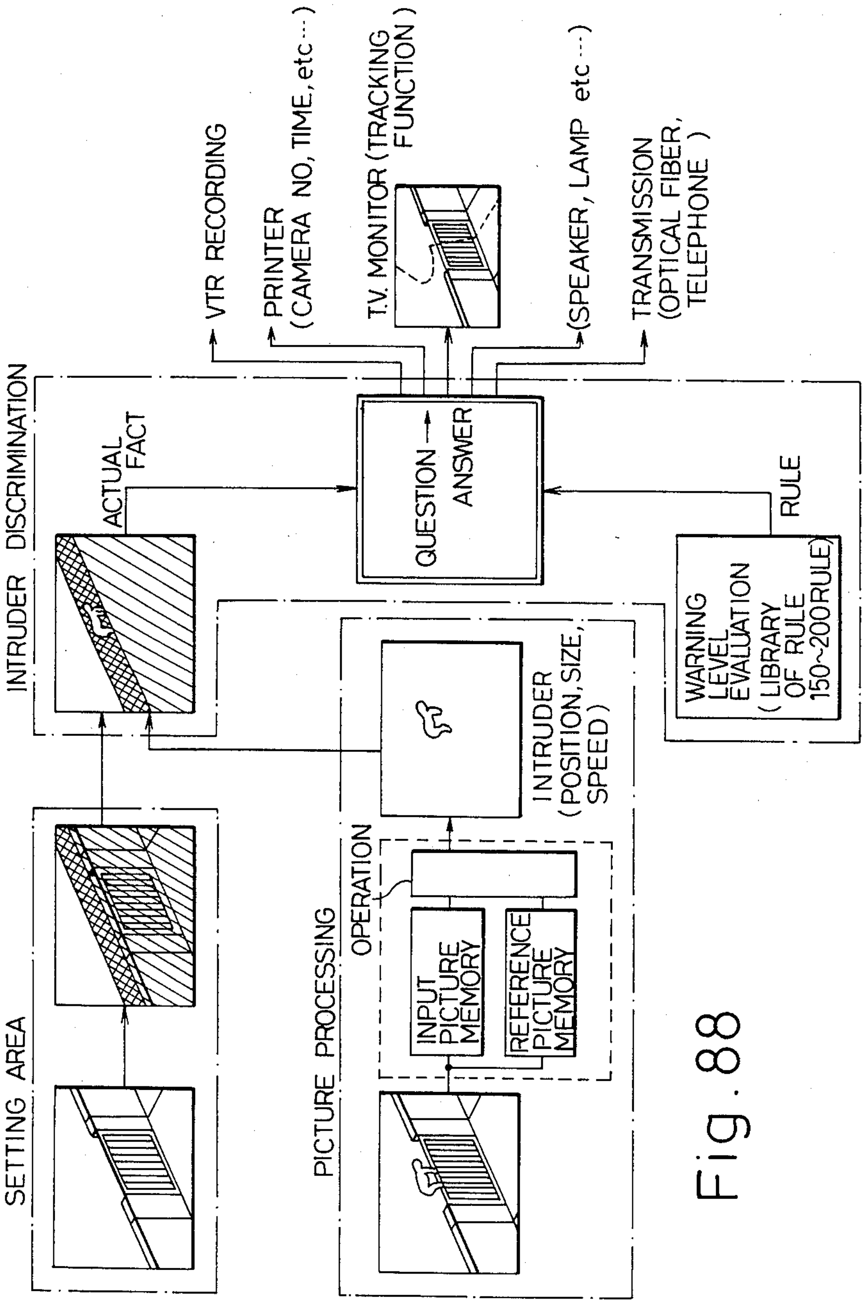
FIG. 88 schematically shows an interior arrangement of the supervisory system of FIG. 87.
Figure 89:
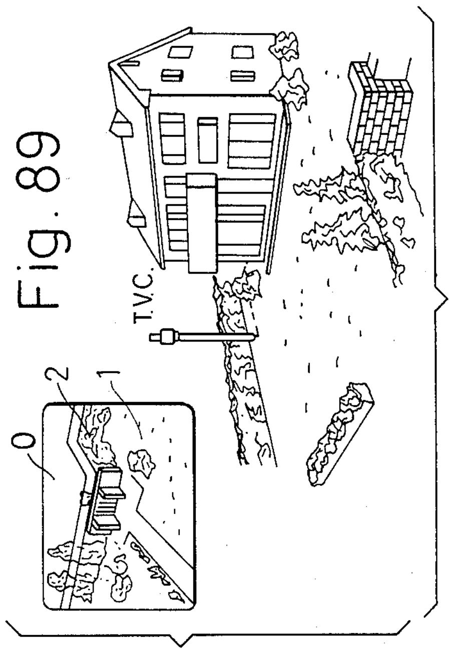
FIGS. 89 to 96 show explanatory views of examples of practical application of the abnormality supervising system according to the present invention.
Figure 90:
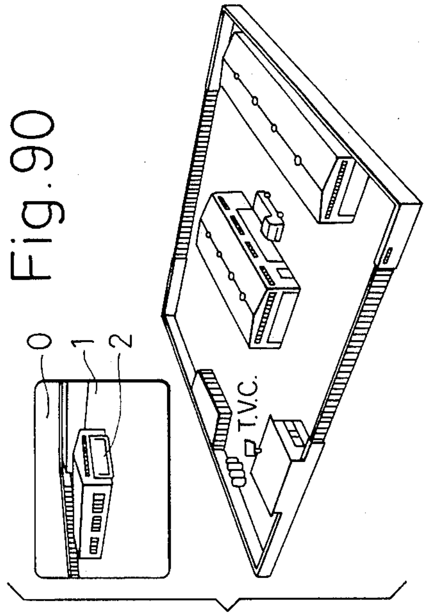
Figure 91:
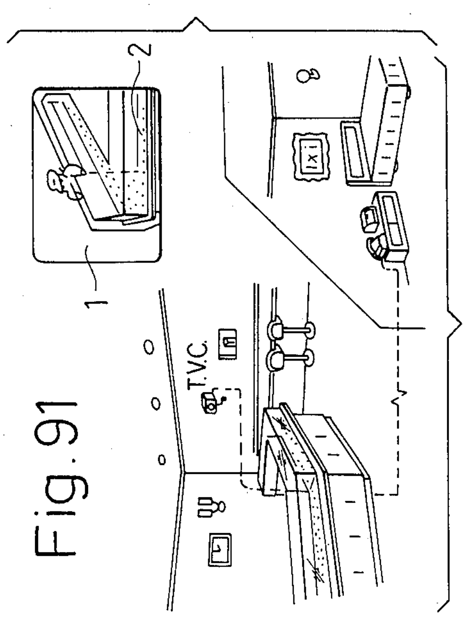
Figure 92:
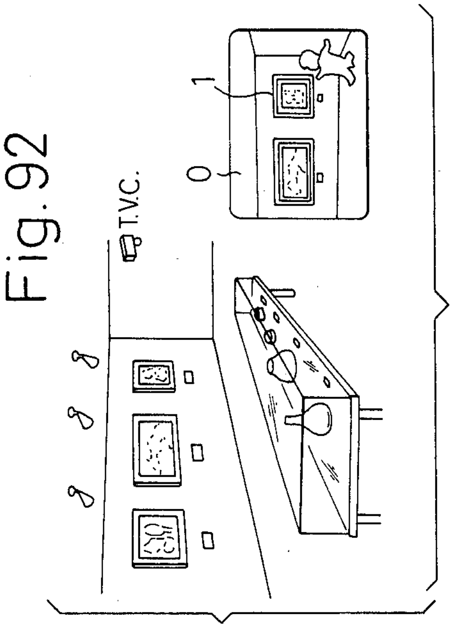
Figure 94:
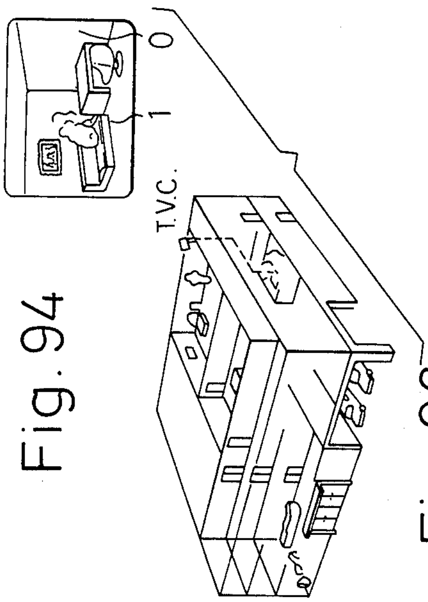
Figure 96:
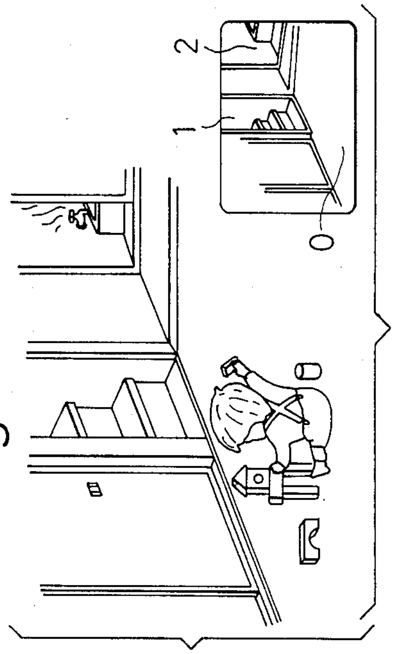
Figure 93:
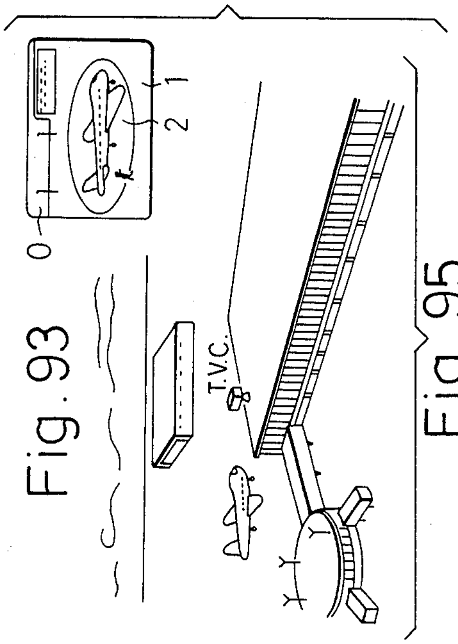
Figure 95:
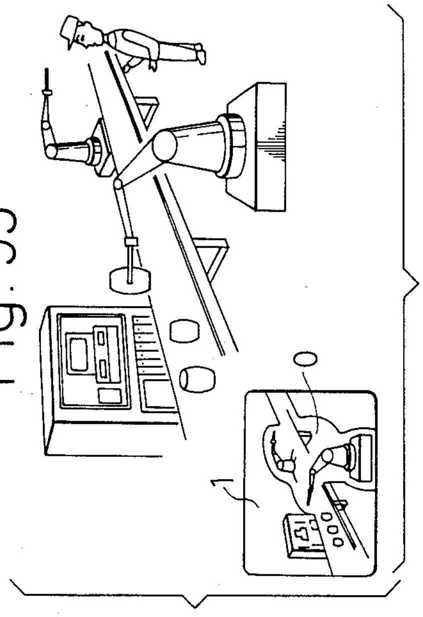

FIGS. 87 and 88 are showing the whole conceptional appearance of the present system and the information processing steps of the system, respectively. From these drawings, the manner in which the respective embodiments disclosed are practiced will be readily understood. Various installation examples of the present system are shown in FIGS. 89 to 96, wherein the different warning levels are numerically given as an example in each monitoring picture of the respective drawings. From these examples, it should be appreciated that the system according to the present invention is so high in the wide adaptability of its use that, as seen in FIG. 96, for example, the system can be employed for informing a danger when an infant playing in a room approaches a staircase, bathroom or like place, and so on.

What is claimed as our invention is:

1. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means and a detection area setting means providing an output to said abnormality discrimination means, said output being of divided detection areas in said input picture and having respectively different warning levels.

2. A system according to claim 2, wherein said warning levels are changeable.

3. A system according to claim 1, which further comprises means for discriminating a normal variation pattern from an abnormal variation pattern of said input picture.

4. A system according to claim 1, which further comprises means for extracting said object from said input picture, and means for tracking movement of said extracted object, said object tracking means comprising a first memory for said extracted object picture, a second memory for said extracted object picture, and a unit receiving outputs from said first and second memories to judge said movement in view of the relationship between both pictures.

5. A system according to claim 1, which further comprises means for extracting said object from said input picture, and means for tracking movement of said extracted object, said object tracking means including means for predicting a moving position of said object, and means for identifying the object.

6. A system according to claim 1, wherein said abnormality discrimination means discriminates said abnormality on the basis of a moving locus with time of said object.

7. A system according to claim 1, wherein said picture input means includes a plurality of picture pickup means installed for overlapping their monitoring zones on each other.

8. A system according to claim 1, wherein said picture processing means includes means for automatically setting a threshold value to convert said input picture to a binary picture and means for determining said threshold value on the basis of an average value of the luminance from a plurality of comparison pictures between said input and reference pictures.

9. A system according to claim 1, wherein said picture processing means comprises a diaphragm correcting means which provides an output thereof to said picture input means for correcting its diaphragm, said diaphragm correcting means including means for detecting a signal necessary for said diaphragm correction from signals of said input picture, means for setting a detection area for said signal detection, and diaphragm correction means for providing a diaphragm correction signal to said picture input means according to said signal obtained by said signal detecting means.

10. A system according to claim 1, wherein a plurality of said detection area setting means are provided for monitoring respectively each of a plurality of sections of said monitoring zone which is relatively broad.

11. A system according to claim 10, wherein said detection area setting means is provided for automatically setting monitoring sections of said monitoring zones.

12. A system according to claim 1, which further comprises means for shifting said detection areas as said object moves within said monitoring zone.

13. A system according to claim 12, wherein said detection area shifting means includes means for extracting said object from said input picture, a memory for storing a detection area set in the picture to enclose the object, and a coordinate conversion means for causing said detection area to be moved to keep enclosing the object moved.

14. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, a detection area setting means providing an output to said abnormality discrimination means, said output being of divided detection areas in said input picture having respectively different warning levels, and a variation pattern memory means for storing a luminance variation pattern in abnormal state, an output of said variation pattern memory means being provided to said abnormality discrimination means.

15. A system according to claim 14, wherein said variation pattern is set to grasp said object moving from one of said areas which is low in said warning level to another area high in the warning level.

16. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said abnormality discrimination and to be compared with said information obtained from said picture processing means to discriminate an abnormality of an object in said monitoring zone, an output means receiving an output of said abnormality discrimination means, a detection area setting means providing an output to said abnormality discrimination means, said output being of divided detection areas in said input picture and having respectively different warning levels, and means for providing to said input picture an attribute area in addition to said detection areas and storing a characteristic corresponding to said attribute area, an attribute ouput of said attribute area being provided to said abnormality discrimination means.

17. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said picture processing means comprising means for inhibiting renewal of said reference picture when said input picture has a luminance variation.

18. A system according to claim 17, wherein said reference picture is obtained by averaging signals of a plurality of said input pictures which are discriminated normal.

19. A system according to claim 18, wherein said input picture except any part thereof showing a variation keeps renewing said reference picture in said picture processing means.

20. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said reference picture being plurally provided in said picture processing means.

21. A system according to claim 20, which further comprises means for preparing another reference picture for eliminating minor noise.

22. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said abnormality discrimination means receiving an output of an external sensor together with said input picture.

23. A system according to claim 22, wherein said external sensor is a distance sensor.

24. A system according to claim 22, wherein said external sensor is a temperature sensor.

25. A system according to claim 22, wherein said external sensor is a sensor for detecting an object located at a dead angle position of said monitoring zone in said input picture.

26. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said picture processing means providing an output to a gate upon overflowing of an A/D converting means, said gate providing a clock signal to a counting means while the gate is on, and said counting means providing an output to said abnormality discriminating means to stop said abnormality discrimination upon reaching a predetermined count.

27. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said picture input means including a plurality of picture pickup means, and means for switching outputs of said plurality of picture pickup means upon presence of luminance variation in said input picture.

28. A system according to claim 27, wherein said switching means is a multiplexer.

29. An abnormality supervising system comprising a picture input means for monitoring a zone to be supervised, a picture processing means for comparing an input picture obtained from said picture input means with a reference picture stored and processing said input picture to obtain information necessary for an abnormality discrimination, an abnormality discrimination means including memory means for preliminarily storing reference information necessary for said abnormality discrimination and to be compared with said information obtained from said picture processing means to discriminate an abnormality of an object in said monitoring zone, an output means receiving an output of said abnormality discrimination means, and said picture input means including color-picture pickup means, and means for extracting only hue components from a picture signal output of said color-picture pickup means and providing said hue components to said picture processing means.

* * * * *